US009506530B2

United States Patent
Matsuda et al.

(10) Patent No.: US 9,506,530 B2
(45) Date of Patent: Nov. 29, 2016

(54) DRIVING DEVICE AND IMAGE FORMING APPARATUS INCORPORATING THE SAME

(71) Applicants: Naoki Matsuda, Kanagawa (JP); Masahiro Ishida, Kanagawa (JP)

(72) Inventors: Naoki Matsuda, Kanagawa (JP); Masahiro Ishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/930,781

(22) Filed: Nov. 3, 2015

(65) Prior Publication Data
US 2016/0146292 A1 May 26, 2016

(30) Foreign Application Priority Data

Nov. 20, 2014 (JP) .................................. 2014-235707

(51) Int. Cl.
 *F16H 3/04* (2006.01)
 *G03G 15/00* (2006.01)
 *F16H 3/089* (2006.01)
 *G03G 21/16* (2006.01)
 *F16H 37/02* (2006.01)
 *F16H 37/06* (2006.01)

(52) U.S. Cl.
 CPC .............. *F16H 3/089* (2013.01); *F16H 37/02* (2013.01); *F16H 37/027* (2013.01); *F16H 37/065* (2013.01); *G03G 21/1647* (2013.01); *F16H 3/04* (2013.01); *G03G 15/757* (2013.01); *G03G 2221/1657* (2013.01)

(58) Field of Classification Search
 CPC ... G03G 2221/1657; F16H 7/02; F16H 1/20; F16H 3/089; F16H 3/04
 See application file for complete search history.

(56) References Cited

U.S. PATENT DOCUMENTS

| | | | |
|---|---|---|---|
| 2006/0153595 A1* | 7/2006 | Yoon ................... | G03G 15/0121 399/228 |
| 2007/0065181 A1* | 3/2007 | Ookushi ............ | G03G 15/0896 399/222 |
| 2011/0206438 A1* | 8/2011 | Igarashi ................ | F16C 17/026 400/578 |
| 2012/0230731 A1* | 9/2012 | Hashimoto ........ | G03G 15/0178 399/167 |
| 2014/0251047 A1 | 9/2014 | Matsuda et al. | |
| 2015/0268614 A1* | 9/2015 | Kiyama .................... | F16H 7/18 399/167 |

FOREIGN PATENT DOCUMENTS

| | | |
|---|---|---|
| JP | 54-103554 | 8/1979 |
| JP | 2010-023983 | 2/2010 |
| JP | 2014-173676 | 9/2014 |

* cited by examiner

*Primary Examiner* — Francis Gray
(74) *Attorney, Agent, or Firm* — Harness, Dickey & Pierce, P.L.C.

(57) ABSTRACT

A driving device includes a first rotary shaft, a second rotary shaft, a drive-transmission device including a plurality of drive-transmission paths, a first output target rotary body, and a second output target rotary body. The plurality of drive-transmission paths selectively transmits a drive force from the first rotary shaft to the second rotary shaft via any one of the plurality of drive-transmission paths. The first output target rotary body is mounted on the first rotary shaft to receive the drive force from the first rotary shaft. The second output target rotary body is mounted on the second rotary shaft to receive the drive force from the second rotary shaft.

12 Claims, 17 Drawing Sheets

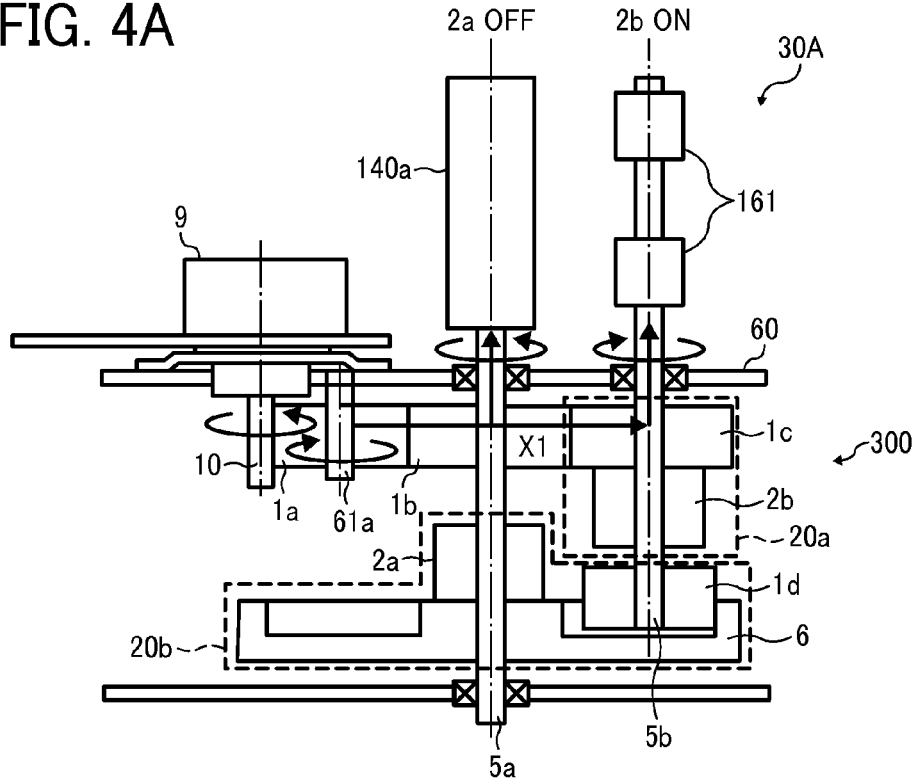
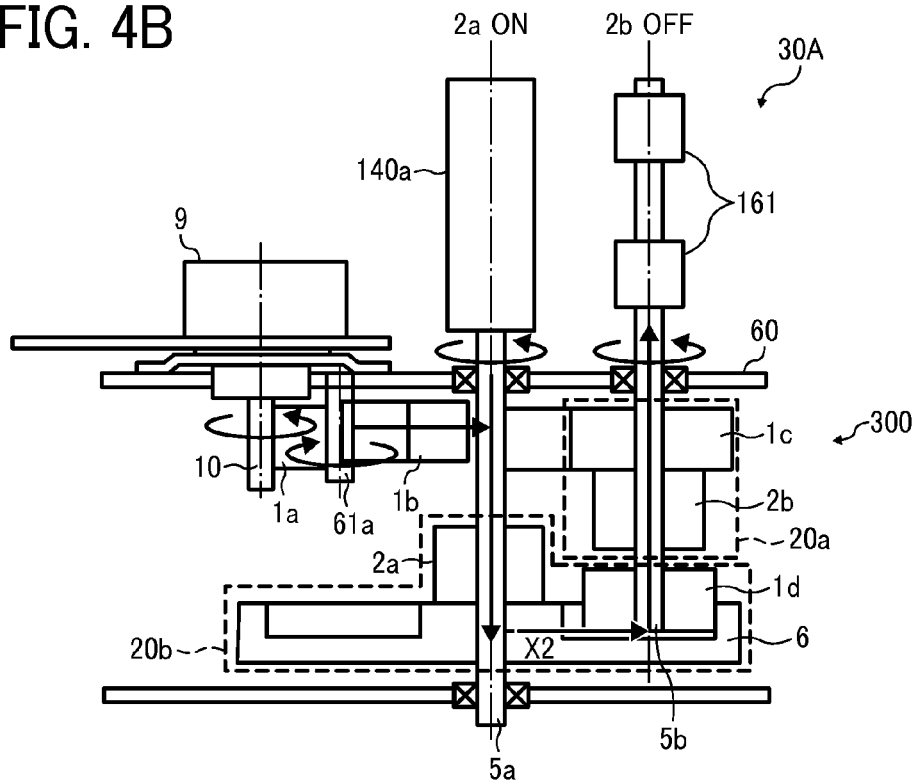

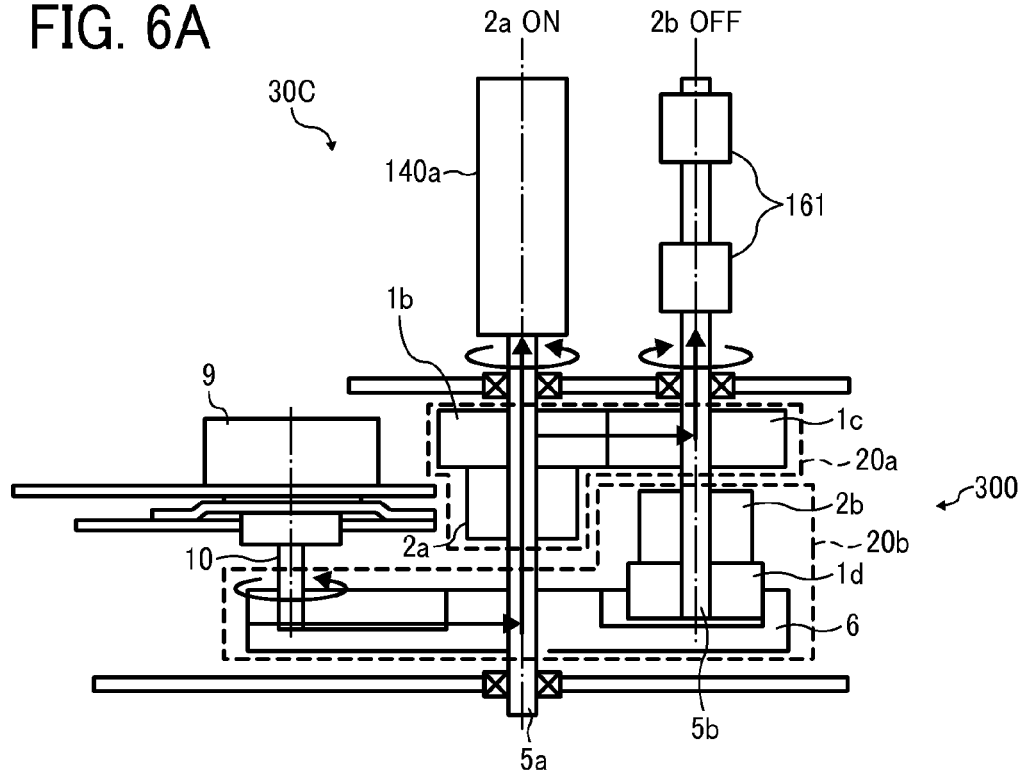
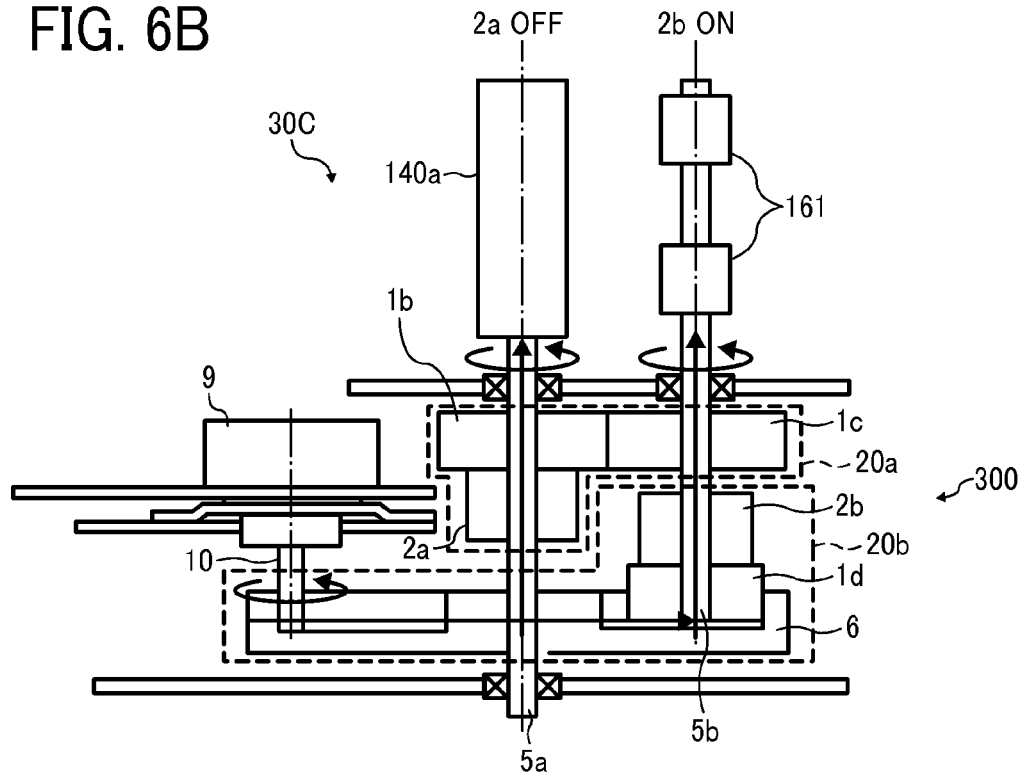

2a OFF 2b ON

2a ON 2b OFF

DRIVING DEVICE AND IMAGE FORMING APPARATUS INCORPORATING THE SAME

CROSS-REFERENCE TO RELATED APPLICATION

This patent application is based on and claims priority pursuant to 35 U.S.C. §119(a) to Japanese Patent Application No. 2014-235707, filed on Nov. 20, 2014, in the Japan Patent Office, the entire disclosure of which is hereby incorporated by reference herein.

BACKGROUND

Technical Field

Exemplary aspects of the present disclosure generally relates to a driving device and an image forming apparatus incorporating the driving device.

Related Art

An image forming apparatus such as a copier, a printer, a facsimile machine, or a multi-functional system including a combination thereof typically includes a large number of driving devices for an image forming operation.

In recent years, to reduce the noise, size, and cost of image forming apparatuses, there is a demand for a reduced number of driving devices, such as drive motors, in the apparatuses. For example, in an image forming apparatus including a driving device to transmit a rotary drive force merely to a single output target rotary body, another driving device is used to rotatably drive a different output target rotary body, which may hamper a successful reduction in noise, size, and cost of the apparatus.

SUMMARY

In an aspect of this disclosure, there is provided an improved driving device including a first rotary shaft, a second rotary shaft, a drive-transmission device including a plurality of drive-transmission paths, a first output target rotary body, and a second output target rotary body. The plurality of drive-transmission paths selectively transmits a drive force from the first rotary shaft to the second rotary shaft via any one of the plurality of drive-transmission paths. The first output target rotary body is mounted on the first rotary shaft to receive the drive force from the first rotary shaft. The second output target rotary body is mounted on the second rotary shaft to receive the drive force from the second rotary shaft.

In another aspect of this disclosure, there is provided an improved image forming apparatus that includes the above-described driving device.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 4A and 4B are schematic plan views of a first variation of the driving device;

FIGS. 6A and 6B are schematic plan views of a third variation of the driving device;

Figure 1:
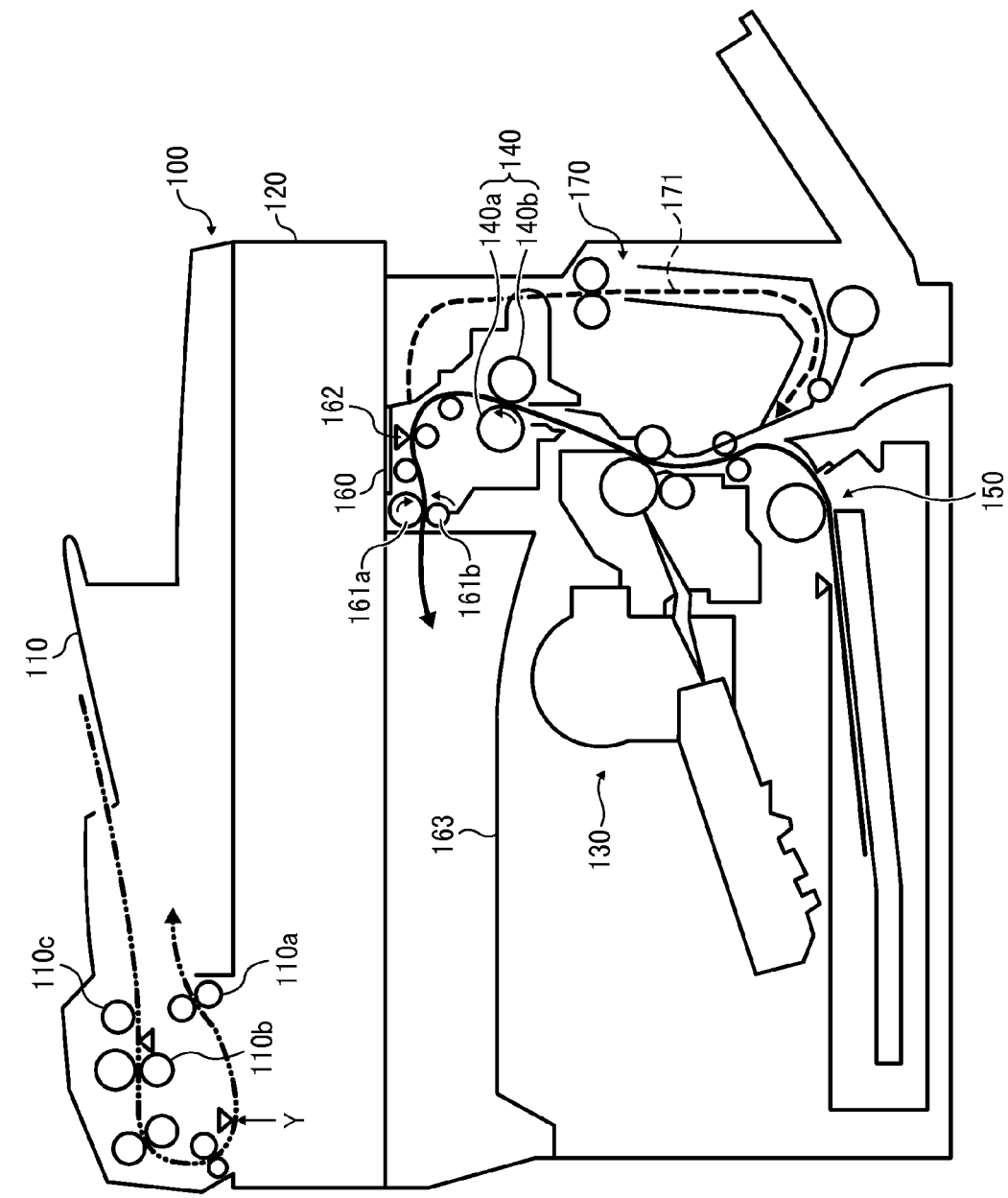
FIG. 1 is a schematic vertical sectional view of an image forming apparatus including a driving device according to an illustrative embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have a similar function, operate in a similar manner and achieve similar results.

Although the embodiments are described with technical limitations with reference to the attached drawings, such description is not intended to limit the scope of the disclosure not and all of the components or elements described in the embodiments of this disclosure are indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

With reference to the drawings, a description is provided of a driving device and an image forming apparatus according to an illustrative embodiment of the present disclosure.

FIG. 1 is a schematic vertical sectional view of an image forming apparatus including a driving device according to an illustrative embodiment of the present disclosure.

As illustrated in FIG. 1, an image forming apparatus 100 includes an automatic document feeder (ADF) 110, a scanner 120, an image forming device 130, a fixing device 140, a sheet feeder 150, an output device 160, and a sheet re-feeder 170.

According to an illustrative embodiment of the present disclosure, the ADF 110 includes a document feeding device adaptable to sheet-through reading. The scanner 120 is a generally-known scanner that reads a document, which has been fed to a scanning position by the ADF 110, while the document is conveyed.

Further, a well-known image forming device is used for the image forming device 130 that includes a photoconductor, a charger, an optical writer, a developing device, a transfer device, a cleaner, and a discharger. Thus, the image forming device 130 causes the optical writer to form a latent image on the photoconductor charged by the charger. The formed latent image is then developed into a visual image, i.e., a toner image by the developing device. Sequentially, the toner image is transferred onto a recording medium by the transfer device. Residual toner not having been transferred onto the recording medium is removed by the cleaner, and residual charge remaining on the photoconductor is returned to the zero potential by the discharger.

The fixing device 140 includes a pair of fixing rollers, e.g., a heat roller 140$a$ and a pressing roller 140$b$.

The sheet feeder 150 picks up a sheet from a stack of the recording media in a sheet tray one sheet at a time, and feeds it to the transfer device side in the image forming device 130.

Still referring to FIG. 1, the output device 160 outputs the recording medium, which has been fed from the fixing device 140, to an output tray 163 and switches back the recording medium to the sheet re-feeder 170 side. That is, the output device 160 includes a pair of output rollers 161$a$ and 161$b$, and an output sensor 162. When the output sensor 162 detects a nip state in which an end portion of the recording medium is interposed between the output rollers 161$a$ and 161$b$, the output rollers 161$a$ and 161$b$ are caused to rotate in the opposite direction, thereby feeding the recording medium to the sheet re-feeder 170.

After entering between the output rollers 161$a$ and 161$b$ of the output device 160, the recording medium is fed by the sheet re-feeder 170 to the image formation device 130 through a switch-back path 171 indicated by a dotted line in FIG. 1. The back surface of the recording medium faces a direction that allows a toner image to be transferred onto the rear surface of the recording medium. In this case, a toner image has been already transferred onto the front surface of the recording medium. It should be noted that the pair of the output rollers 161$a$ and 161$b$ is configured to rotate in reverse by meshing the external teeth thereof in response to the rotary input.

Figure 2A:
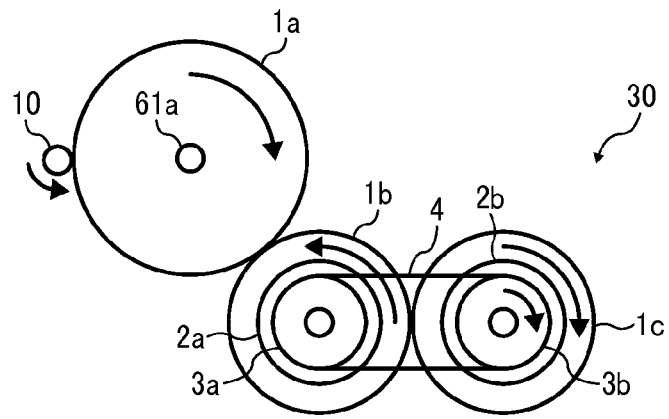
FIGS. 2A and 2B are schematic sectional views of the driving device.
Figure 2B:
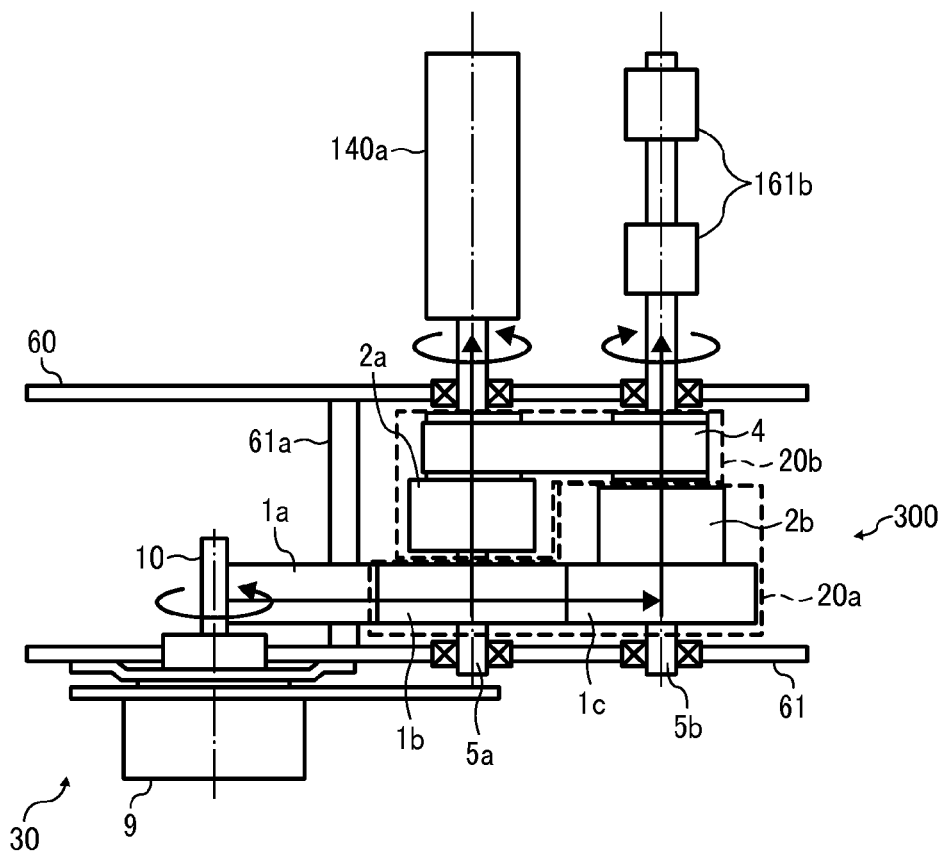

Each of FIGS. 2A and 2B is a schematic view of a driving device 30 that drives the heat roller 140$a$ and a lower output roller 161$b$, i.e., one of the output rollers described above. FIG. 2A is a schematic front view of the driving device 30, and FIG. 2B is a schematic plan view of the driving device 30.

The driving device 30 includes a first rotary shaft 5$a$ and a second rotary shaft 5$b$. The first rotary shaft 5$a$ is connected to the heat roller 140$a$ serving as a first output target rotary body. A drive motor 9 of the driving device 30 outputs a drive force to the heat roller 140$a$. The second rotary shaft 5$b$ is connected to the lower output roller 161$b$ serving as a second output target rotary body. That is, the lower output roller 161$b$ ultimately receives the drive force from the drive motor 9. The driving device 30 also includes an outer face plate 61 equipped with the drive motor 9 serving as a drive source, and an inner face plate 60. Both of the first rotary shaft 5$a$ and the second rotary shaft 5$b$ are rotatably supported by the outer face plate 61 and the inner face plate 60 via shaft bearings.

The driving device 30 includes a drive gear 1$a$, an input gear 1$b$, and an output gear 1$c$. The drive gear 1$a$ meshes with a motor gear 10 of the drive motor 9. The drive gear 1$a$ is rotatably supported by a gear shaft 61$a$ which is fixed on both the outer face plate 61 and the inner face plate 60. The first rotary shaft 5$a$ has an input gear 1$b$, an input-side clutch 2$a$, and an input-side pulley 3$a$ in this order from the outside. The input gear 1$b$ fixed on the first rotary shaft 5$a$ meshes with the drive gear 1$a$. The second rotary shaft 5$b$ has an output gear 1$c$, an output-side clutch 2$b$, and an output-side pulley 3$b$ in this order from the outside. The output gear 1$c$ meshes with the input gear 1$b$. A timing belt 4 is entrained about and stretched taut between the input-side pulley 3$a$ and the output-side pulley 3$b$ fixed on the second rotary shaft 5$b$.

According to the present illustrative embodiment, there are two drive-transmission paths, i.e., a first drive-transmission path 20$a$ and a second drive-transmission path 20$b$, to transmit the drive force from the first rotary shaft 5$a$ to the second rotary shaft 5$b$ in the driving device 30. The first drive-transmission path 20$a$ includes the input gear 1$b$, the output gear 1$c$, and the output-side clutch 2$b$. Each of the input gear 1$b$ and the output gear 1$c$ is an external gear. The second drive-transmission path 20$b$ includes the input-side clutch 2$a$, the input-side pulley 3$a$, the timing belt 4, and the output-side pulley 3$b$. A drive-transmission device 300 serving as a part of the driving device 30 includes these drive-transmission paths.

When the input-side clutch 2$a$ is set OFF and the output-side clutch 2$b$ is ON, the second rotary shaft 5$b$ receives a drive force through the first drive-transmission path 20$a$. In this case, the second rotary shaft 5$b$ is driven to rotate in the opposite direction to the first rotary shaft 5$a$, and the lower output roller 161$b$ thereby rotates in the opposite direction to the heat roller 140$a$. When the second rotary shaft 5$b$ rotates by the drive force received through the first drive-transmission path 20$a$, the output-side pulley 3$b$ starts rotating together with the second rotary shaft 5$b$ in a direction opposite to that of the first rotary shaft 5$a$. As a result, the input-side pulley 3$a$ is driven to rotate in the opposite direction to the first rotary shaft 5$a$ by the drive force transmitted through the timing belt 4. At this time, as the input-side clutch 2$a$ is set OFF as described above, the input-side pulley 3$a$ is detached from the first rotary shaft 5$a$. Accordingly, the input-side pulley 3$a$ rotates idly with respect to the first rotary shaft 5$a$ while rotating in the opposite direction to the first rotary shaft 5$a$.

Figure 3A:
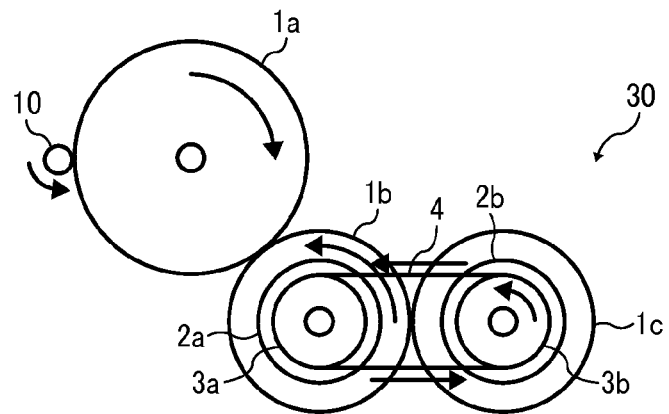
FIGS. 3A and 3B are illustrations of drive transmission through a second drive-transmission path in the driving device.
Figure 3B:
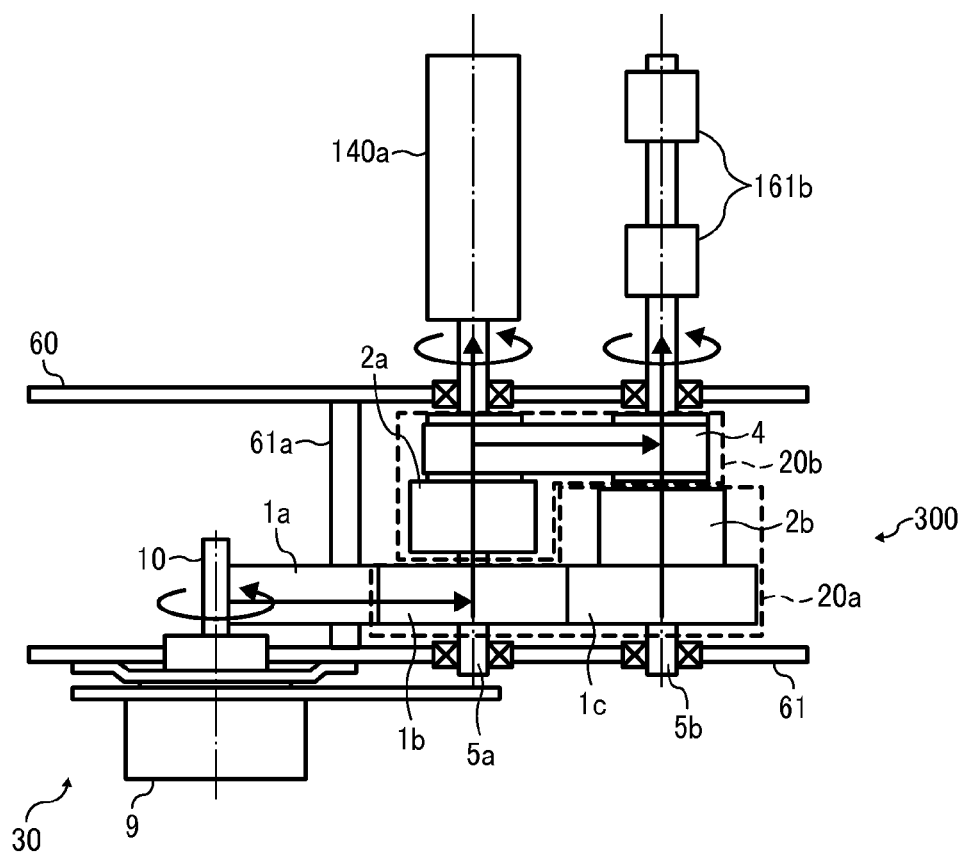

Now referring to FIGS. 3A and 3B, when the input-side clutch 2$a$ is set ON, and the output-side clutch 2$b$ is set OFF, the second rotary shaft 5$b$ receives a drive force transmitted through the second drive-transmission path 20$b$. In this case, the second rotary shaft 5$b$ is driven to rotate in the same direction as that of the first rotary shaft 5$a$, and the lower output roller 161$b$ rotates in the same direction as the heat roller 140$a$. The output gear 1$c$ rotates in the opposite direction to that of the second rotary shaft 5$b$ by the drive force transmitted from the input gear 1$b$. At this time, as the output-side clutch 2$b$ is set OFF as described above, the output gear 1$c$ is detached from the second rotary shaft 5$b$. Accordingly, the output gear 1$c$ rotates idly with respect to the second rotary shaft 5$b$ while rotating in the opposite direction to the second rotary shaft 5$b$.

In this way, in the present illustrative embodiment, the first drive-transmission path 20$a$ functions as a reverse drive-transmission path, and the second drive-transmission path 20$b$ functions as a forward drive-transmission path.

It should be noted that the first rotary shaft 5$a$ rotates by the drive force transmitted from the drive gear 1$a$ to the input gear 1$b$ at a constant rotational speed both when rotating in the same direction as the first rotary shaft 5a and when rotating in the opposite direction to the first rotary shaft 5a. With this configuration, the heat roller 140a continuously rotates forward at a constant rotational speed irrespective of the forward or reverse rotation of the lower output roller 161b. Such a configuration allows a favorable and reliable fixing performance.

A description is provided of switching operation between clutches 2a and 2b. In order to start an image forming operation, the output-side clutch 2b is set OFF and the input-side clutch 2a is set ON to drive the drive motor 9. The first rotary shaft 5a then receives a drive force via the drive gear 1a and the input gear 1b so that the drive force received at the first rotary shaft 5a is ultimately transmitted to the heat roller 140a, thereby rotating the heat roller 140 forward. In addition, the second rotary shaft 5b receives a drive force via the second drive-transmission path 20b, and the received drive force is transmitted to the lower output roller 161b ultimately, thereby rotating the lower output roller 161b forward.

In the case of duplex printing, when the output sensor 162 (refer back to FIG. 1) detects a rear edge of the recording medium which is being fed forward, the input-side clutch 2a is switched from ON to OFF. Then, the output-side clutch 2b is switched from OFF to ON. Accordingly, the drive-transmission path to the second rotary shaft 5b is switched from the second drive-transmission path 20b to the first drive-transmission path 20a, so that the lower output roller 161b rotates in the opposite direction. Accordingly, the recording medium is switched back and fed to the sheet re-feeder 170. When the output sensor 162 (refer to FIG. 1) detects a rear edge of the recording medium which is being fed backward, the output-side clutch 2b is switched from ON to OFF. Then, the input-side clutch 2a is switched from OFF to ON. Accordingly, the drive-transmission path to the second rotary shaft 5b is switched from the first drive-transmission path 20a to the second drive-transmission path 20b, so that the lower output roller 161b rotates forward again. Subsequently, the recording medium having both faces printed is output onto an output tray 163.

According to the present illustrative embodiment, no rotary shafts equipped with any drive-transmission member are employed for transmitting a drive force from the first rotary shaft 5a to the second rotary shaft 5b in any of the plurality of drive-transmission paths. With such a configuration, space in the radial direction can be reduced as compared with the configuration in which a rotary shaft equipped with a drive-transmission member is employed in at least one of the plurality of the drive-transmission paths. As a result, greater freedom in design of the layout in the image forming apparatus 100 can be obtained.

According to the present illustrative embodiment, the driving device 30 drives both the heat roller 140a and the lower output roller 161b to rotate. With this configuration, the number of the drive motors and drive-transmission members can be reduced as compared to the configuration in which the lower output roller 161b and the heat roller 140a are driven to rotate separately by different motors. Accordingly, noise such as a motor noise of drive motors and vibration noise of the drive motors or drive-transmission members can be reduced. Such a configuration provides a compact and low-cost device because the number of the drive motors and the drive-transmission members is reduced.

When the lower output roller 161b rotates forward, there is a case in which the front edge of the recording medium comes into contact with the lower output roller 161b, thereby imposing a significant stress on the output rollers 161. Accordingly, a significant load fluctuation occurs in the second drive-transmission path 20b. When the lower output roller 161b rotates in the opposite direction, the recording medium interposed between the pair of the output rollers 161a and 161b is switched back. Thus, the front edge of the recording medium does not contact the lower output roller 161b. Therefore, less load fluctuation occurs in the first drive-transmission path 20a than the second drive-transmission path 20b.

In the present illustrative embodiment, considering the circumstances described above, the timing belt 4 is employed in the second drive-transmission path 20b in which a significant load fluctuation possibly occurs when transmitting a drive force. In a configuration in which the second drive-transmission path 20b includes gears such as an internal gear and an external gear, the gears possibly collide with each other, damaging the teeth and making noise when the front edge of the recording medium comes into contact with the output rollers 161, which creates a significant load fluctuation relative to the lower output roller 161b. However, the timing belt 4 is employed in the second drive-transmission path 20b to prevent such a load fluctuation. Specifically, when the front edge of the recording medium contacts the output rollers 161 and a significant load fluctuation occurs in the output rollers 161 accordingly, the timing belt 4 deforms elastically, thereby absorbing the occurred load fluctuation. In the case of the first drive-transmission path 20a in which a significant load fluctuation does not occur, as the first drive-transmission path 20a includes external gears, the durability of the path is enhanced as compared to the configuration that utilizes the timing belt or the internal gear.

In addition to the configuration described above in which a drive force is transmitted to the lower output roller 161b, the drive force may be transmitted to an upper output roller 161a in some embodiments. In this case, when the upper output roller 161a rotates in the opposite direction to that of the heat roller 140a, the recording medium advances forward to an output tray. When the upper output roller 161a rotates in the same direction as the heat roller 140a does, the recording medium is switched back and conveyed backward. When switching back the recording medium, the drive force is transmitted through the second drive-transmission path 20b that utilizes the timing belt 4. When outputting the recording medium to the output tray 163, the drive force is transmitted through the first drive-transmission path 20a including external gears. Whether the drive force is transmitted to the lower output roller 161b or to the upper output roller 161a is determined in accordance with the configuration of the apparatus.

For example, when switching back and conveying backward the recording medium quickly in order to improve printing productivity, one clutch is set ON immediately after the other clutch is set OFF. At this time, the output rollers still rotate forward due to inertia action. Therefore, if one clutch is set ON immediately after the other clutch is set OFF to reverse the rotation direction of the output rollers, a significant load is imposed on the output rollers. After the recording medium is switched back, the recording medium takes some time to come back to the output tray. Accordingly, after setting one clutch ON, the other clutch should not be set ON to rotate the output rollers forward again until the output rollers stops rotating completely. Thus, in some cases, more significant load is imposed on the output rollers rotating reverse than the output rollers rotating forward. In such a case, the drive force should be transmitted to the upper output roller 161a through the second drive-transmission path 20b that utilizes the timing belt 4 to rotate the upper output roller 161a in the opposite direction.

When rotating the output rollers in the forward direction, the conveyance speed of the recording medium cannot be accelerated to maintain a favorable fixing performance. However, when switching back and conveying backward the recording medium, the conveyance speed can be increased because no other operations but the conveyance of the recording medium is performed. Accordingly, it is preferable that the rotation speed is faster in the reverse rotation than the forward rotation. In this way, when increasing the rotation speed of the output rollers rotating reversely, the upper output roller 161a should be preferably caused to rotate in the opposite direction by transmitting the drive force to the upper output roller 161a through the second drive-transmission path 20b that utilizes the timing belt 4. Further, noise can be reduced in a high-speed rotation range when transmitting drive force with the use of a timing belt as compared to when using external gears. Therefore, noise can be reduced when switching back the recording medium.

Next, a description is provided of variations of the driving device.

It should be noted that the upper output roller 161a and the lower output roller 161b are collectively referred to as "output roller 161" below when these rollers are not distinguished from each other.

[Variation 1]

FIGS. 4A and 4B are schematic plan views of a first variation of a driving device 30A. FIG. 4A illustrates the output rollers 161 rotate in the opposite direction to the heat roller 140a. FIG. 4B illustrates the output rollers 161 rotate in the same direction as the heat roller 140a does.

In the first variation, an internal gear 6 is mounted on the second drive-transmission path. In addition, in the first variation, the drive motor 9 is disposed on the inner face plate 60, which is placed more toward the inner side than the drive-transmission member in the device. With this configuration, in which that the drive motor 9 is disposed toward the inner side of the device, the noise of the drive motor 9 is masked, resulting in a quieter driving device.

Drive force is transmitted from the drive motor 9 to the first rotary shaft 5a via the drive gear 1a and the input gear 1b in the same manner as described above. Referring to the first variation, the drive motor 9 is disposed on the surface of the inner face plate 60 facing the heat roller 140a and the like, and the drive gear 1a and the input gear 1b are mounted around the inner face plate 60 accordingly. The first drive-transmission path 20a includes the output gear 1c and the output-side clutch 2b in the same manner as the present illustrative embodiment does. The second drive-transmission path 20b includes the input-side clutch 2a, the internal gear 6, and an external gear 1d that meshes with the inner teeth of the internal gear 6. The internal gear 6 is mounted on the first rotary shaft 5a via the input-side clutch 2a.

In order to rotate the output rollers 161 in the opposite direction to the heat roller 140a, the input-side clutch 2a is set OFF and the output-side clutch 2b is set ON. Accordingly, as indicated by arrow X1 in FIG. 4A, the drive force is transmitted from the first rotary shaft 5a to the second rotary shaft 5b via the first drive-transmission path 20a so that the second rotary shaft 5b rotates in the opposite direction to the first rotary shaft 5a. As a result, the output roller 161 rotates in the opposite direction to that of the heat roller 140a.

In order to rotate the output roller 161 in the same direction as the heat roller 140a does, the input-side clutch 2a is set ON and the output-side clutch 2b is set OFF. Accordingly, as indicated by arrow x2 in FIG. 4B, the drive force is transmitted from the first rotary shaft 5a to the second rotary shaft 5b via the second drive-transmission path 20b so that the second rotary shaft 5b rotates in the same direction as the first rotary shaft 5a. As a result, the output roller 161 rotates in the same direction as the heat roller 140a.

In the first variation, the internal gear 6 is employed in the second drive-transmission path 20b, thereby increasing the meshing ratio of the internal gear 6 and the external gear 1d, which suppresses the noise and vibration of the driving device 30A. Therefore, the second drive-transmission path 20b is preferably used for the transmission of the drive force that is operated more frequently and for a longer period of time. Specifically, the output rollers rotate forward to output a recording medium onto the output roller more frequently and for a longer period of time than a case in which the output roller rotates reversely to switch back the recording medium. Therefore, the output roller 161 rotates forward by transmitting the drive force to the lower output roller 161b via the second drive-transmission path 20b. With this configuration, the quietness of the driving device is enhanced effectively.

Further, the internal gear 6 is not as durable as the external gear. Thus, it is preferable that the second drive-transmission path 20b is used for transmitting the drive force with lower torque. For example, as described above, the clutches are switched promptly to convey the recording medium in a switch-back manner. In the case in which load on the torque is more significant for when switching back and conveying the recording medium backward, the drive force is transmitted to the lower output roller 161b via the second drive-transmission path 20b to rotate the output rollers 161 forward.

[Variation 2]

Figure 5A:
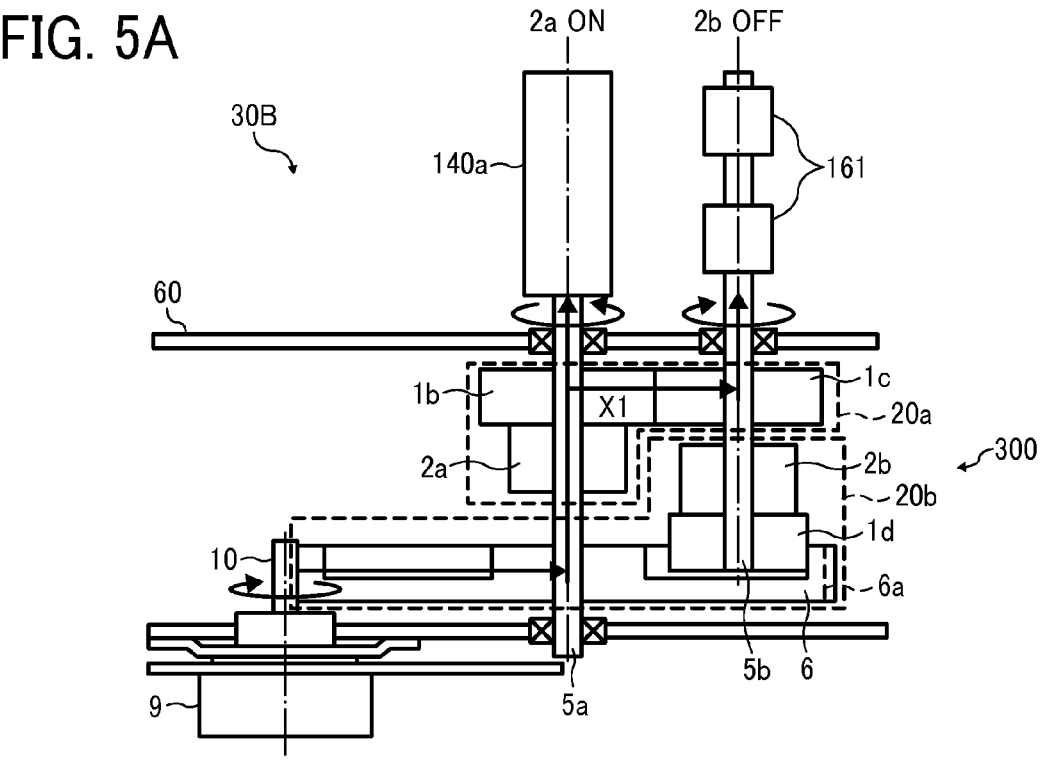
FIGS. 5A and 5B are schematic plan views of a second variation of the driving device.
Figure 5B:
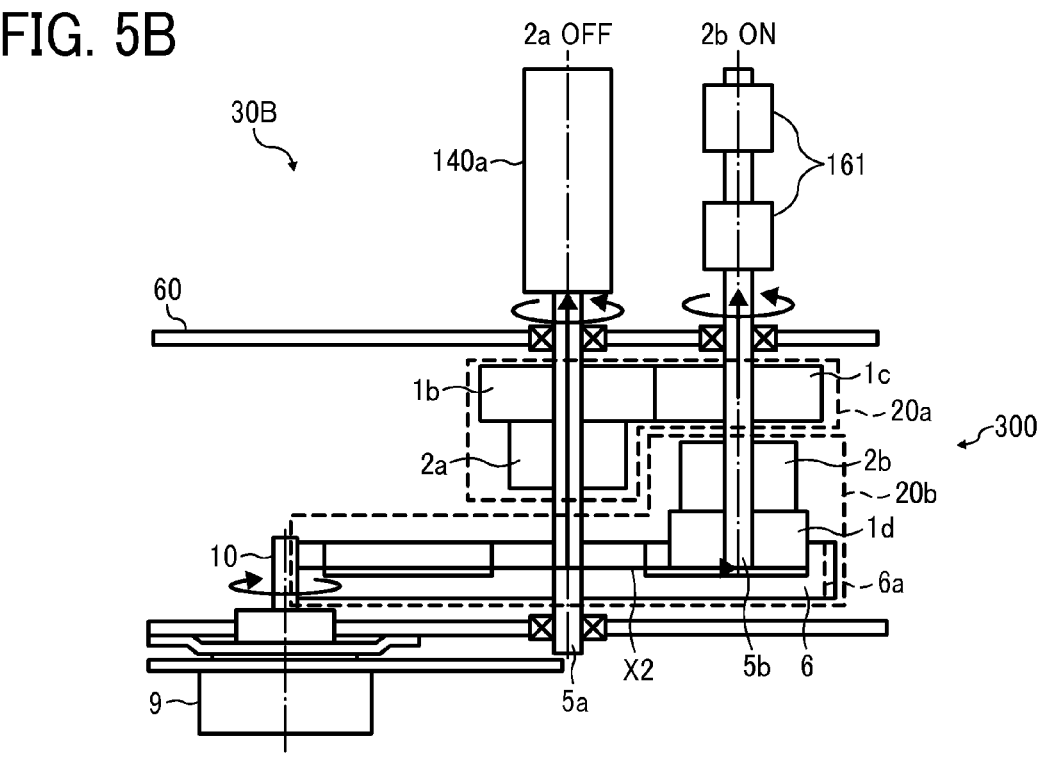

FIGS. 5A and 5B are schematic plan views of a second variation of a driving device 30B. FIG. 5A illustrates the output rollers 161 rotate in the opposite direction to the heat roller. FIG. 5B illustrates the output rollers rotate in the same direction as the heat roller 140a does.

In this variation, the internal gear 6 is provided with an external gear 6a that meshes with a motor gear 10 of the drive motor 9. With this configuration, the drive gear 1a and the gear shaft 61a supporting the drive gear 1a can be eliminated, thus reducing the number of components. That is, fewer components are employed in the second variation than in the first variation. As a result, a space necessary for the driving device is saved, and greater freedom in the design of the layout in the image forming apparatus 100 can be obtained.

In the second variation 2, the first drive-transmission path 20a, through which the output rollers 161 rotate in the opposite direction to that of the heat roller 140a, includes the input-side clutch 2a, the input gear 1b, and the output gear 1c. The input gear 1b is mounted on the first rotary shaft 5a via the input-side clutch 2a. In addition, the second drive-transmission path 20b, through which the output rollers rotate in the same direction as the heat roller 140a does, includes the internal gear 6, the external gear 1d, and the output-side clutch 2b. The external gear 1d is mounted on the second rotary shaft 5b via the output-side clutch 2b. The internal gear 6 is fixed on the first rotary shaft 5a.

As illustrated in FIG. 5A, in order to rotate the output roller 161 in the opposite direction to that of the heat roller 140a does, the input-side clutch 2a is set ON and the output-side clutch 2b is set OFF. The first rotary shaft 5a rotes by the drive force transmitted from the drive motor 9 via a motor gear 10 and the internal gear 6. Accordingly, the heat roller 140a connected to the first rotary shaft 5a starts rotating at a predetermined rotation speed. The external gear 1d also rotates with the internal gear 6 that meshes with the external gear 1d. The external gear 1d, however, rotates idly relative to the second rotary shaft 5b because the output-side clutch 2b is set OFF and the external gear 1d is unconnected to the second rotary shaft 5b.

As the input-side clutch 2a is set ON to be connected with the first rotary shaft 5a, the input gear 1b rotates with the first rotary shaft 5a. Accordingly, a drive force is transmitted to the second rotary shaft 5b via the output gear 1c as indicated by arrow X1 in FIG. 5A. Accordingly, the second rotary shaft 5b is driven to rotate in the opposite direction to the first rotary shaft 5a, and the lower output roller 161b, which is connected to the second rotary shaft 5b, rotates in the opposite direction to the heat roller 140a.

As illustrated in FIG. 5B, in order to rotates the output roller 161 in the same direction as the heat roller 140a, the input-side clutch 2a is set OFF and the output-side clutch is set ON. When the input-side clutch 2a is set OFF, the input gear 1b rotates idly relative to the first rotary shaft 5a, interrupting the transmission of the drive force from the output gear 1c to the second rotary shaft 5b.

However, when the output-side clutch 2b is set ON, thereby connecting the second rotary shaft 5b with the external gear 1d, the drive force is transmitted from the external gear 1d to the second rotary shaft 5b as indicated by arrow X2 in FIG. 5B, so that the second rotary shaft 5b rotates in the same direction as the first rotary shaft 5a does. As a result, the output rollers 161, which are connected to the second rotary shaft 5b, rotate in the same direction as the heat roller 140a.

[Variation 3]

FIGS. 6A and 6B are schematic plan views of a third variation of a driving device 30C. FIG. 6A illustrates the output rollers 161 rotate in the opposite direction to the heat roller 140a. FIG. 4B illustrates the output rollers 161 rotate in the same direction as the heat roller 140a does.

In the third variation, the motor gear 10 meshes with the internal teeth of the internal gear 6. With this configuration in which the motor gear 10 meshes with the internal teeth of the internal gear 6, the meshing ratio of the motor gear 10 and the internal gear 6 is increased, thereby suppressing rotation unevenness, noise, and vibration due to meshing failure of the gears. The other parts have the same configuration as in the second variation.

[Variation 4]

Figure 7A:
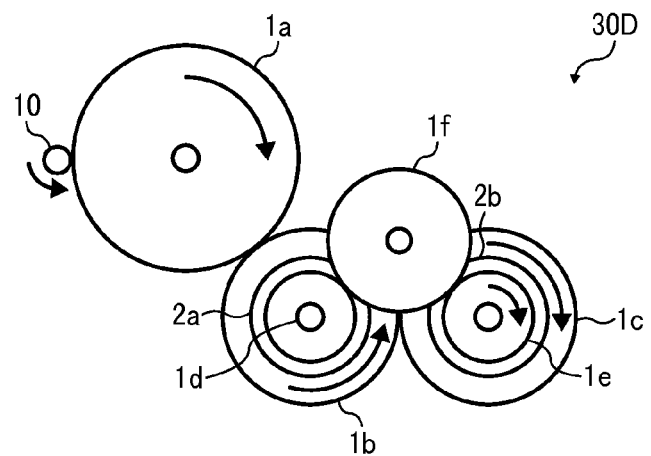
FIGS. 7A and 7B are schematic plan views of a fourth variation of the driving device.
Figure 7B:
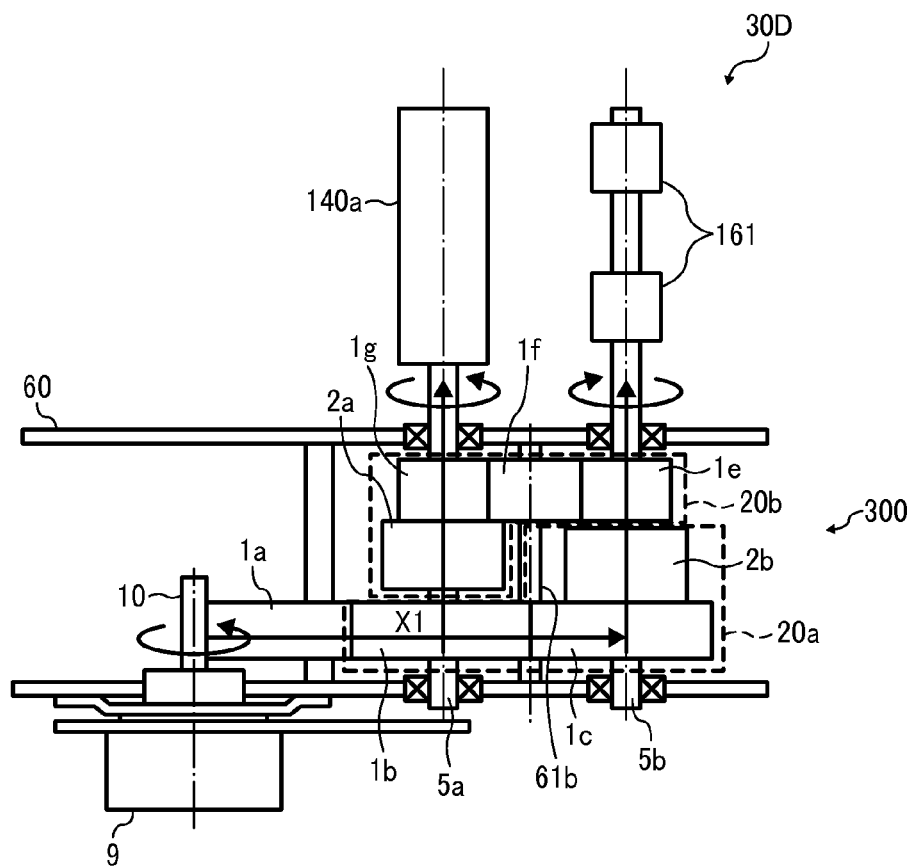

FIGS. 7A and 7B are schematic plan views of a fourth variation of a driving device 30D. FIG. 7A is a schematic front view of the driving device 30 according to the fourth variation thereof, and FIG. 7B is a schematic plan view of the driving device 30D according to the fourth variation thereof.

In the fourth variation, each of the first drive-transmission path 20a and the second drive-transmission path 20b includes only external gears.

The manner in which drive force is transmitted from the drive motor 9 to the first rotary shaft 5a and the configuration of the first drive-transmission path 20a are the same as those of the driving device 30 illustrated in FIG. 2 above.

The second drive-transmission path 20b includes an input external gear 1g, an intermediate external gear 1f, output external gear 1e, and the input-side clutch 2a. The internal gear 6 is mounted on the first rotary shaft 5a via the input-side clutch 2a. The intermediate external gear 1f is rotatably supported by an intermediate gear shaft 61b which is fixed between the inner face plate 60 and the outer face plate 61. The output external gear 1e, which is fixed onto the second rotary shaft 5b, meshes with the intermediate external gear 1f.

In order to rotate the output rollers 161 in the opposite direction to that of the heat roller 140a, the input-side clutch 2a is set ON and the output-side clutch 2b is set OFF. Accordingly, as in the same manner as the driving device of FIG. 2 does, a drive force is transmitted to the second rotary shaft 5b via the first drive-transmission path 20a so that the second rotary shaft 5b rotates in the opposite direction to the first rotary shaft 5a. As a result, the output rollers 161, which are connected to the second rotary shaft 5b, rotate in the opposite direction to the heat roller 140a.

Figure 8A:
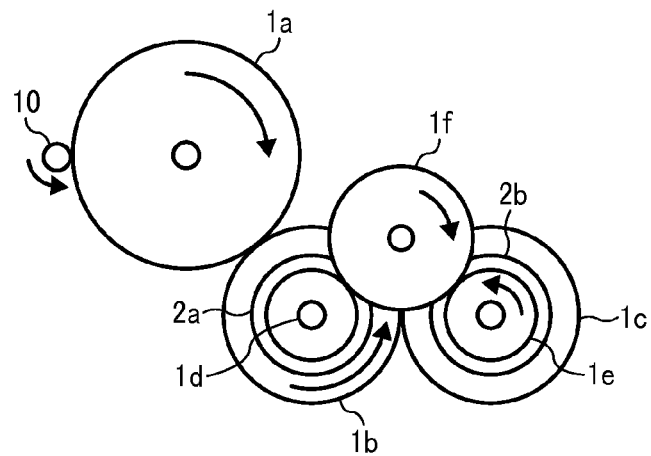
FIGS. 8A and 8B illustrate drive transmission through the second drive-transmission path in the fourth variation of the driving device.
Figure 8B:
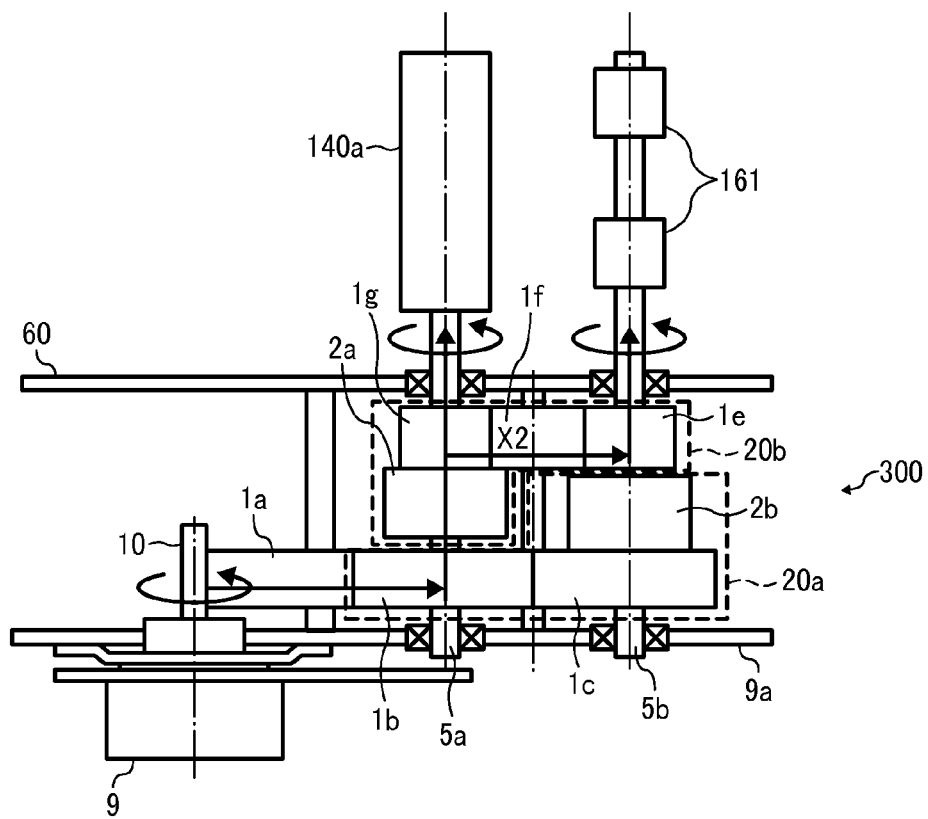

In order to rotate the output rollers 161 in the same direction as the heat roller 140a does, the input-side clutch 2a is set ON and the output-side clutch 2b is set OFF. Accordingly, as illustrated in FIGS. 8A and 8B, the output gear 1c rotates idly relative to the second rotary shaft 5b while the input external gear 1g of the second drive-transmission path 20b rotates together with the first rotary shaft 5a. Accordingly, as indicated by arrow X2 in FIG. 8B, a drive force is transmitted to the second rotary shaft 5b via the intermediate external gear 1f and the output external gear 1e so that the second rotary shaft 5b rotates in the same direction as the first rotary shaft 5a does. As a result, the output rollers 161, which are connected to the second rotary shaft 5b, rotate in the same direction as the heat roller 140a.

The driving device 30D according to the fourth variation is more durable than the driving device that utilizes internal gears and a timing belt in either of the drive-transmission paths. This is because the driving device 30D according to the fourth variation has the first drive-transmission device and the second drive-transmission device, both including external gears only.

Further, the first drive-transmission path 20a, which has fewer gears (teeth meshing with each other), produces less noise and is more durable than the second drive-transmission path 20b does. Therefore, the first drive-transmission path 20a is preferably used for the transmission of the drive force that is operated more frequently and for longer period of time. Specifically, the output rollers 161 rotates forward to advance a recording medium more frequently and for a longer period of time than a case in which the output roller rotates backward to switch back the recording medium. Thus, the first drive-transmission path 20a is used for when the output rollers 161 rotate forward. In this case, the drive force is transmitted to the lower output roller 161b. With this configuration, the output rollers 161 is driven to rotate forward by transmitting the force through the first drive-transmission path 20a.

[Variation 5]

Figure 9A:
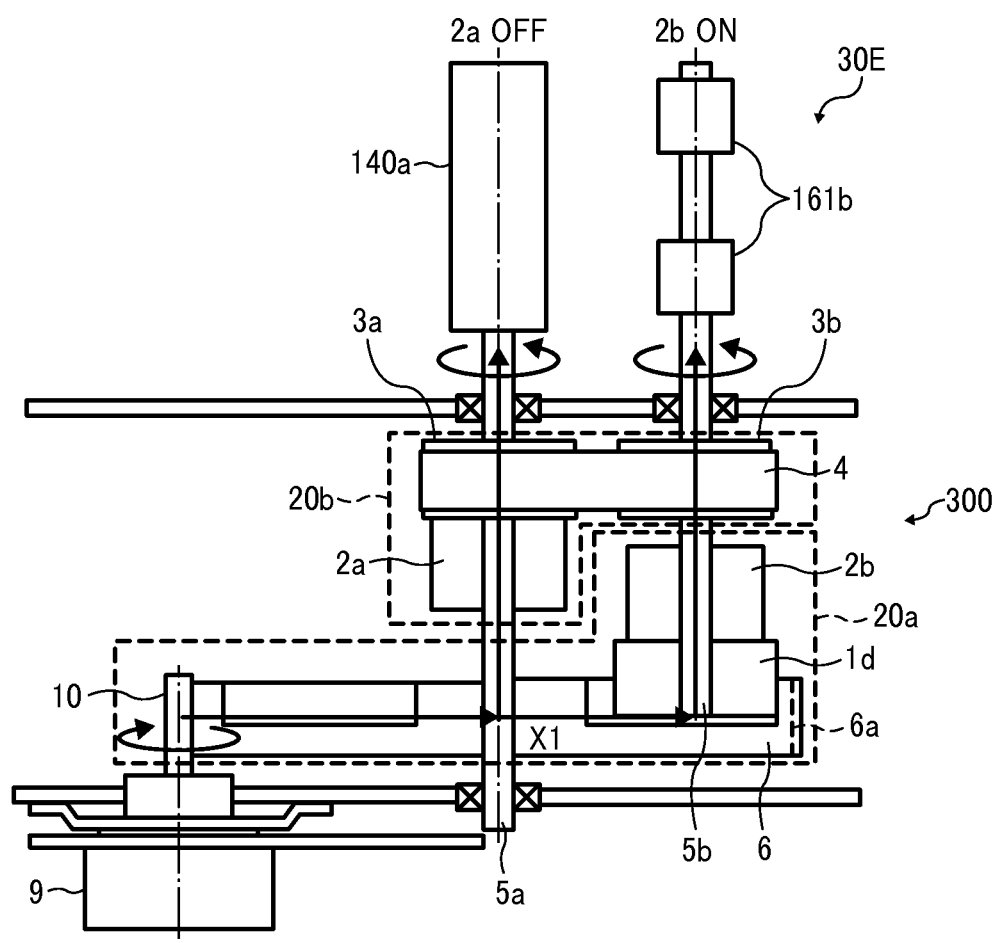
FIGS. 9A and 9B are schematic plan views of a fifth variation of the driving device.
Figure 9B:
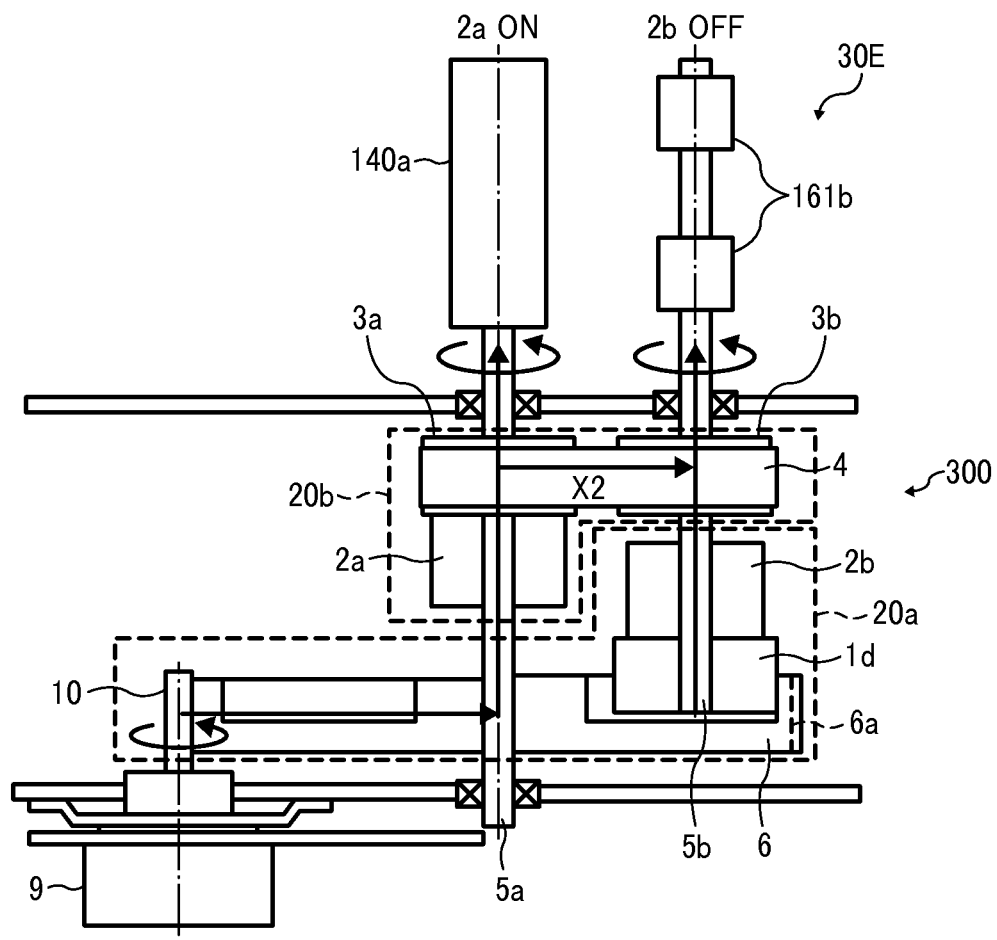

FIGS. 9A and 9B are schematic plan views of a fifth variation of a driving device 30E. FIG. 9A illustrates a drive force is transmitted through the first drive-transmission path 20a, and FIG. 9B illustrates the drive force is transmitted through the second drive-transmission path 20b.

The driving device 30E according to the fifth variation includes the first drive-transmission path 20a that employs the internal gear 6. The first drive-transmission path has the same configuration as the first drive-transmission path of the driving device illustrated in FIG. 5. The second drive-transmission path 20b employs the timing belt 4 and has the same configuration as the second drive-transmission path of the driving device illustrated in FIG. 2 above does.

Now referring to FIG. 9A, when the input-side clutch $2a$ is set OFF and the output-side clutch $2b$ is set ON, the second rotary shaft $5b$ receives the drive force via the first drive-transmission path $20a$ as indicated by arrow X1, thereby rotating in the same direction as the first rotary shaft $5a$ does at a first rotation speed.

As illustrated in FIG. 9B, when the input-side clutch $2a$ is set ON and the output-side clutch $2b$ is set OFF, the second rotary shaft $5b$ receives the drive force via the second drive-transmission path $20b$ as indicated by arrow X2, thereby rotating in the same direction as the first rotary shaft $5a$ does at a second rotation speed.

In the fifth variation, the first rotation speed is faster than the second rotation speed, and faster than that of the first rotary shaft $5a$. The second rotation speed is the same or slightly faster than that of the first rotary shaft $5a$.

In the fifth variation, when the lower output roller $161b$ receives the drive force and the rear edge of the recording medium advancing forward, exits the fixing device 140, the second rotation speed is switched to the first rotation speed to increase the rotation speed of the lower output roller $161b$. With this configuration, the recording medium is output to the output tray 163 promptly, thus increasing productivity in the image forming apparatus of the present disclosure.

A detailed description is provided of one example of a drive control with the fifth variation. In order to start an image forming operation, the input-side clutch $2a$ is set ON and the output-side clutch $2b$ is set OFF to drive the drive motor 9. At this time, drive force is transmitted through the second drive-transmission path $20b$, and the lower output roller $161b$ rotates at substantially the same speed as the heat roller $140a$ does, i.e., the second rotation speed accordingly. When the output sensor 162 detects the front edge of the recording medium, which is being fed forward, measuring time is started. Subsequently, when a predetermined time at which the rear edge of the recording medium, which is being fed forward, exits the fixing device comes, the input-side clutch $2a$ is set OFF before the output-side clutch $2b$ is set ON. The predetermined time is determined beforehand based on the conveyance speed of the recording medium. Thereupon, the drive force is transmitted to the second rotary shaft $5b$ via the first drive-transmission path $20a$, causing the lower output roller $161b$ to rotate at a faster speed than that of the heat roller $140a$, i.e., the first rotation speed. With this configuration, speeding up the conveyance of the recording medium, the recording medium is output to the output tray 163 promptly, which increases productivity in the image forming apparatus of the present disclosure.

[Variation 6]

Figure 10A:
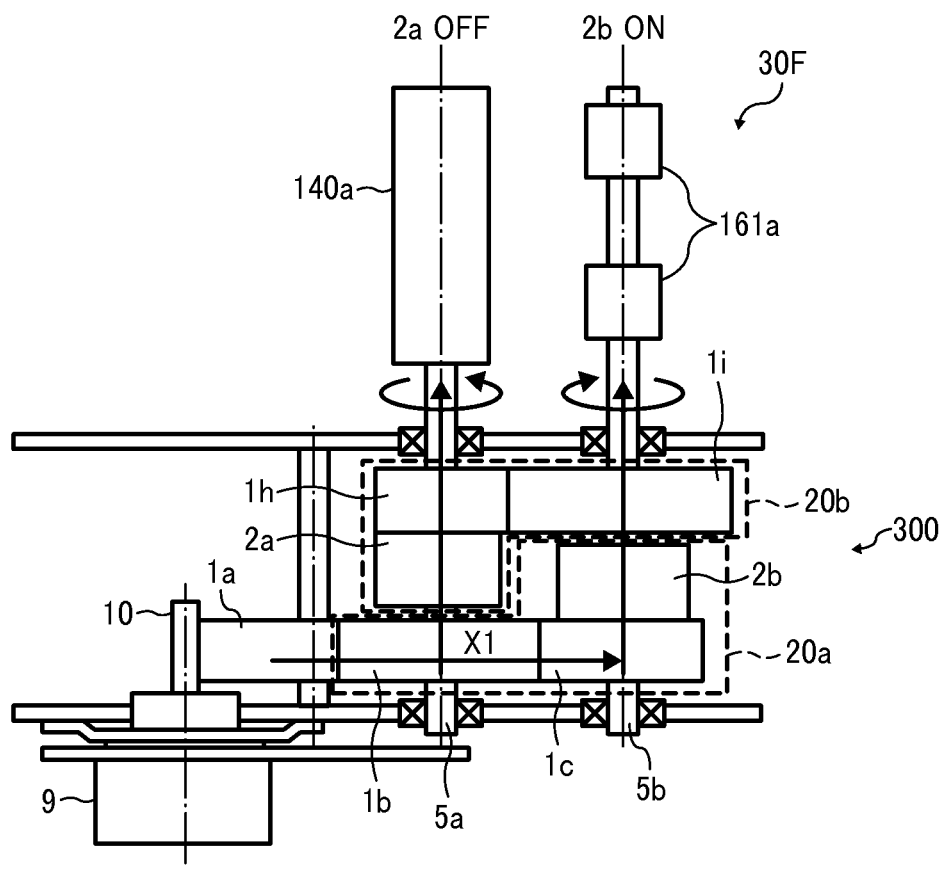
FIGS. 10A and 10B are schematic plan views of a sixth variation of the driving device.
Figure 10B:
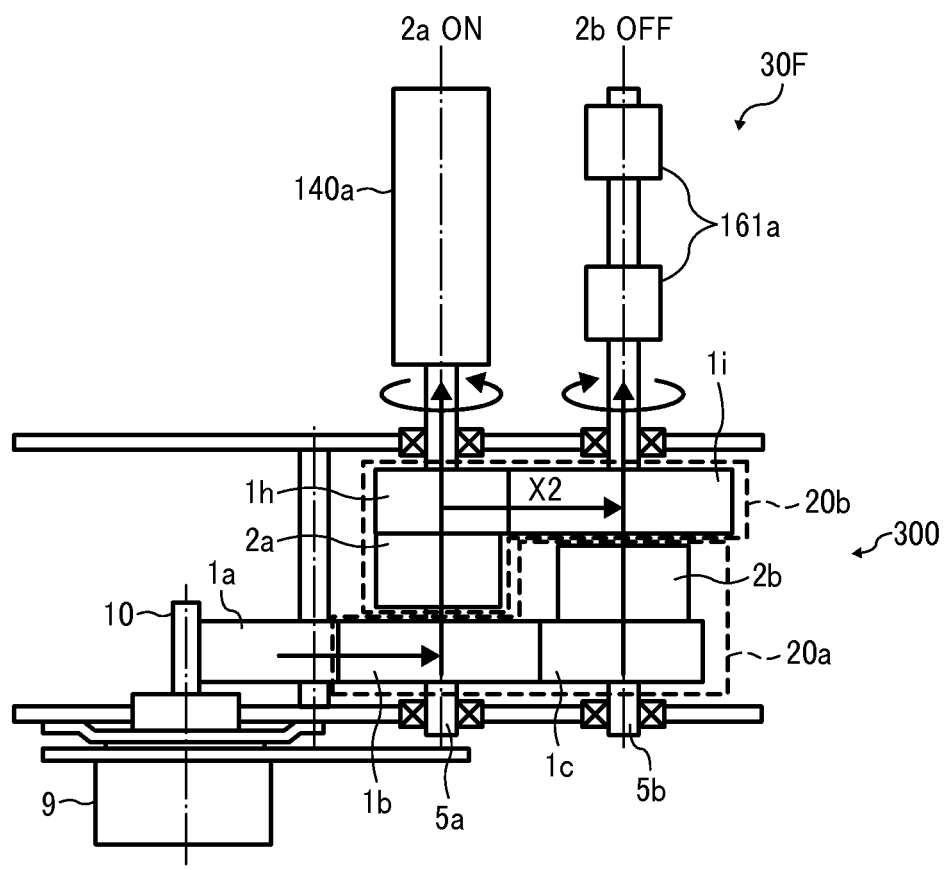

FIGS. 10A and 10B are schematic plan views of a sixth variation of a driving device 30F. FIG. 10A illustrates a drive force is transmitted through the first drive-transmission path $20a$, and FIG. 10B illustrates the drive force is transmitted through the second drive-transmission path $20b$.

In the sixth variation, the second rotary shaft $5b$ rotates in the opposite direction to and at a different rotation speed than the first rotary shaft $5a$ by employing either of the first drive-transmission path $20a$ or the second drive-transmission path $20b$. That is, the second rotary shaft $5b$ rotates in such a manner irrespective of which drive-transmission path the drive force is transmitted through.

The first drive-transmission path $20a$ has the same configuration as that of the driving device illustrated in FIG. 2, and the second drive-transmission path $20b$ has the same configuration as in FIG. 5.

As illustrated in FIG. 10A, when the input-side clutch $2a$ is set OFF and the output-side clutch is set ON, the second rotary shaft $5b$ receives the drive force via the first drive-transmission path $20a$ as indicated by arrow X1 in FIG. 10A, thereby rotating in the opposite direction to the first rotary shaft $5a$ at the first rotation speed.

As illustrated in FIG. 10B, when the input-side clutch $2a$ is set ON and the output-side clutch $2b$ is set OFF, the second rotary shaft $5b$ receives the drive force via the second drive-transmission path $20b$, which includes an input gear $1h$ and an output gear $1i$, as indicated by arrow X2. Accordingly, the second rotary shaft $5b$ rotates in the opposite direction to the first rotary shaft $5a$ at the second rotation speed different from the first rotation speed.

The first rotation speed and the second rotation speed are easily adjusted by a gear ratio of the drive-transmission paths. Further, in the sixth variation, each of the first drive-transmission path and the second drive-transmission path includes external gears only. With such a configuration, durability is enhanced as compared to the configuration that employs internal gears and a timing belt. Therefore, such a configuration can be employed in apparatuses with a long product life and high torque.

[Variation 7]

Figure 11A:
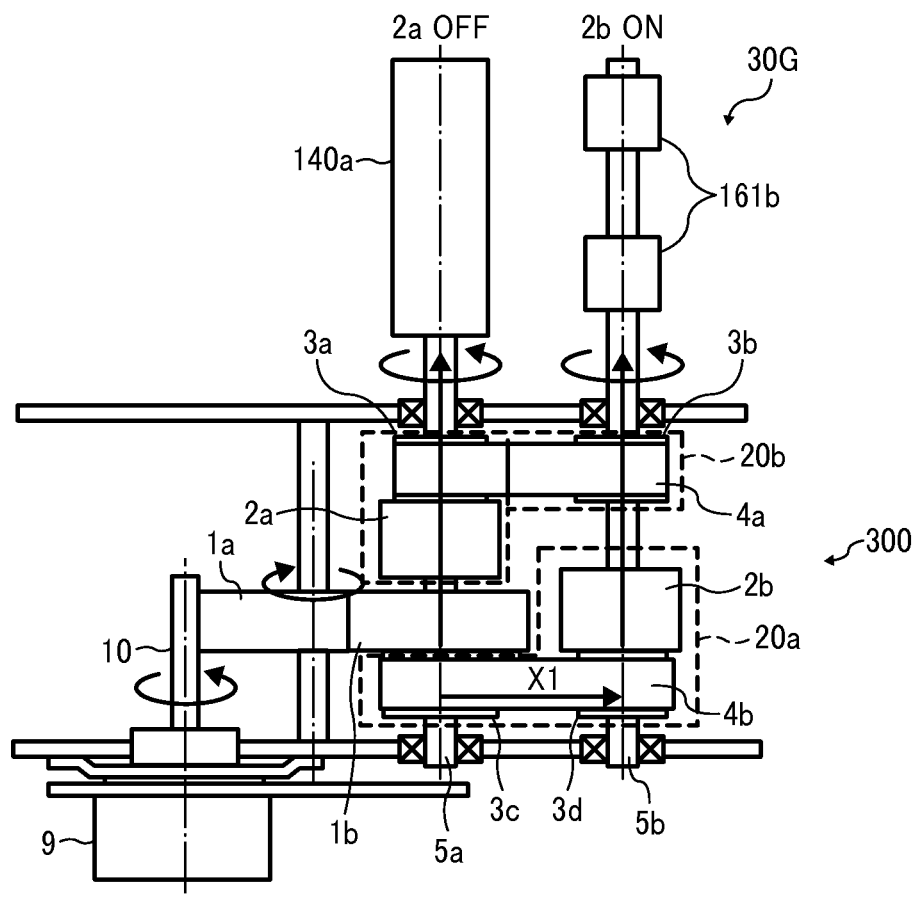
FIGS. 11A and 11B are schematic plan views of a seventh variation of the driving device.
Figure 11B:
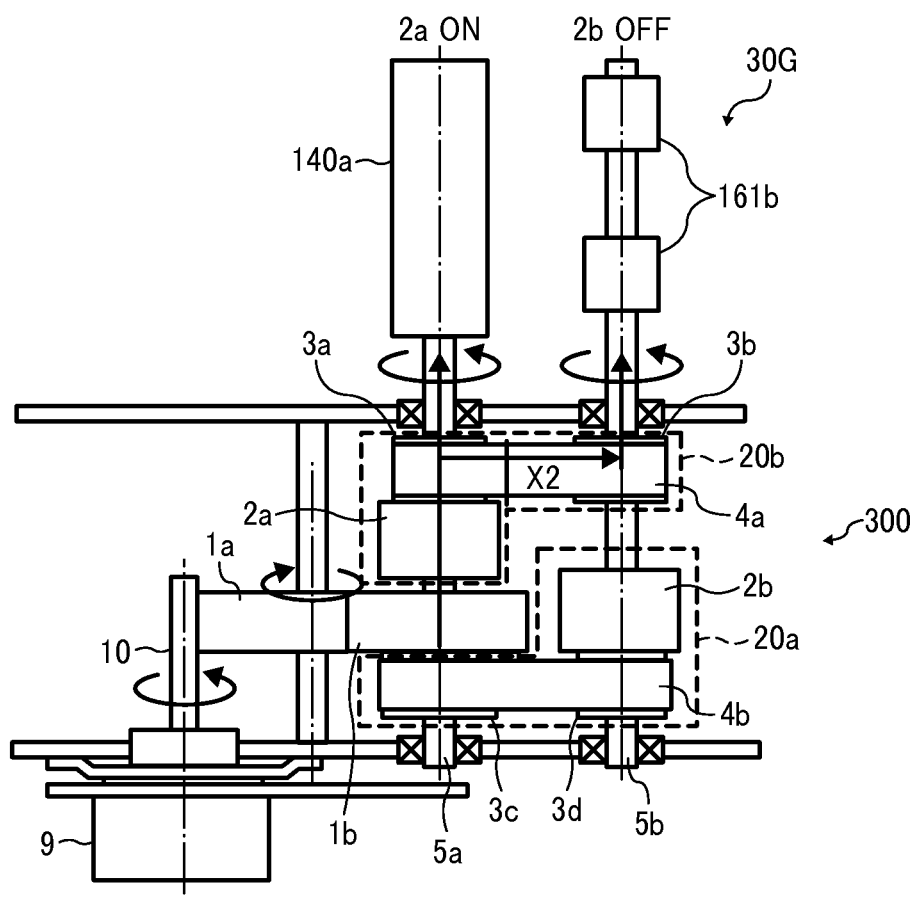

FIGS. 11A and 11B are schematic plan views of a seventh variation of a driving device 30G. FIG. 11A illustrates a drive force is transmitted through the first drive-transmission path $20a$, and FIG. 11B illustrates the drive force is transmitted through the second drive-transmission path $20b$.

In the seventh variation, the first drive-transmission path $20a$ and the second drive-transmission path $20b$ include timing belts $4a$ and $4b$, respectively.

The drive force is transmitted to the first rotary shaft $5a$ via the drive gear $1a$ and the input gear $1b$, so that the first rotary shaft $5a$ rotates at a predetermined rotation speed. The drive gear $1a$ meshes with the motor gear 10, and the input gear $1b$ is fixed on the first rotary shaft $5a$. The first drive-transmission path $20a$ includes a first input-side pulley $3c$, a first output-side pulley $3d$, a first timing belt $4b$, and the output-side clutch $2b$. The first timing belt $4b$ is entrained about and stretched taut around the first input-side pulley $3c$ and the first output-side pulley $3d$. The first input-side pulley $3c$ is fixed on the first rotary shaft $5a$, and the first output-side pulley $3d$ is mounted on the second rotary shaft $5b$ via the output-side clutch $2b$. The second drive-transmission path $20b$ has the same configuration as the driving device of FIG. 2 does.

As illustrated in FIG. 11A, when the input-side clutch $2a$ is set OFF and the output-side clutch is set ON, the second rotary shaft $5b$ receives the drive force via the first drive-transmission path $20a$ as indicated by arrow X1 in FIG. 11A, thereby rotating in the same direction as the first rotary shaft $5a$ does, at the first rotation speed.

Now referring to FIG. 11B, the input-side clutch $2a$ is ON, and the output-side clutch $2b$ is OFF. In this case, the drive force is transmitted through the second drive-transmission path $20b$ to the second rotary shaft $5b$, as indicated by arrow X2. Accordingly, the second rotary shaft $5b$ rotates in the same direction as the first rotary shaft $5a$ at the second rotation speed, which is different from the first rotation speed.

Each of the first rotation speed and the second rotation speed is adjusted by a diameter ratio of the input-side pulley and the output-side pulley. In the seventh variation, as each of the first drive-transmission path $20a$ and the second drive-transmission path $20b$ includes a timing belt, the input-side pulley, the output-side pulley, and clutches can constitute the drive-transmission path even when the first rotary shaft $5a$ and the second rotary shaft $5b$ are spaced apart. Therefore, no additional components is required for the transmission of the drive force even when the first rotary shaft 5*a* and the second rotary shaft 5*b* are disposed away from each other. Furthermore, such a configuration is advantageous from the viewpoint of noise reduction and space saving in a high-speed range, as compared to the configuration that utilizes the internal gears and external gears. In addition, this configuration with the timing belt is suitable for transmitting the drive force to rollers that require high-speed switching because the timing belt elastically deforms to absorb a load fluctuation.

[Variation 8]

Figure 12:
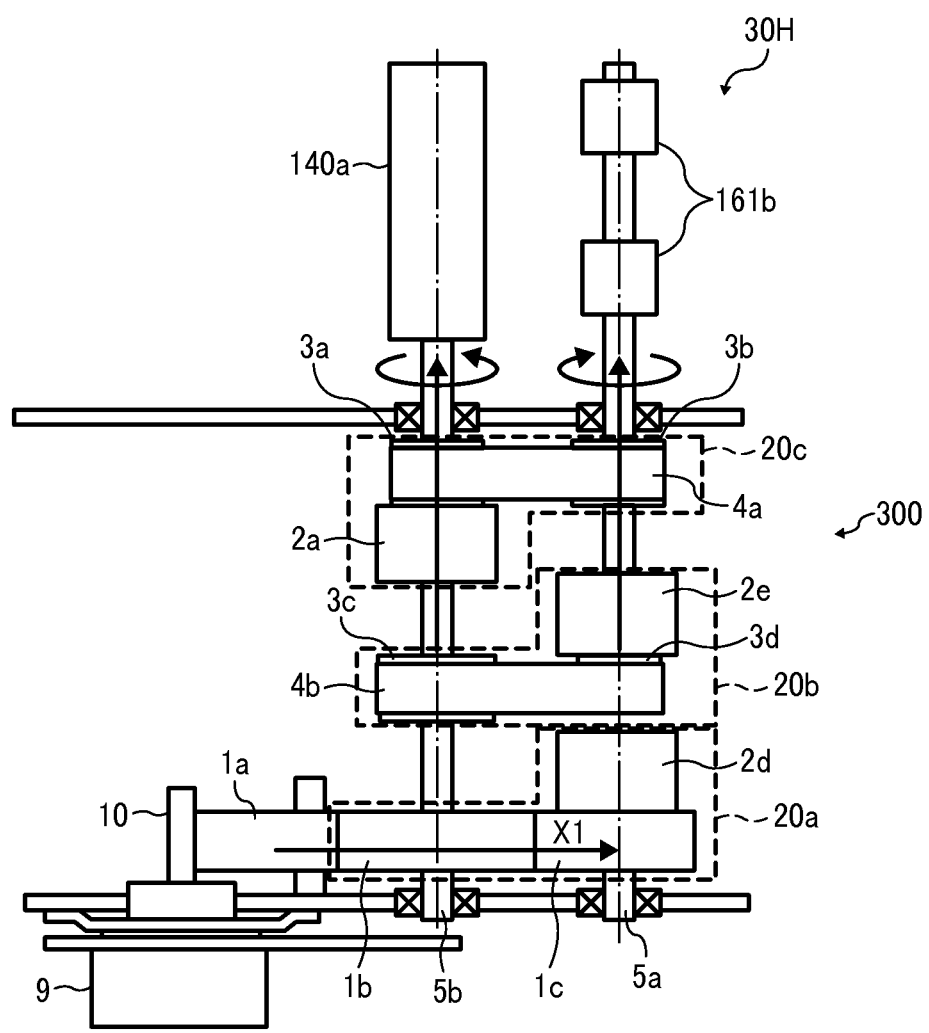
FIG. 12 is a schematic plan view of an eighth variation of the driving device.

FIG. 12 is a schematic plan view of an eighth variation of a driving device 30H.

In the eighth variation, there are three drive-transmission paths from the first rotary shaft 5*a* to the second rotary shaft 5*b*.

The first drive-transmission path 20*a* has the same configuration as the first drive-transmission path of the driving device of FIG. 2 does. The second drive-transmission path 20*b* has the same configuration as the first drive-transmission path of the driving device of FIG. 11A. The third drive-transmission path 20*c* has the same configuration as the second drive-transmission path of the driving device of FIG. 11B.

When the input-side clutch 2*a* is OFF, the first output-side clutch 2*d* of the first drive-transmission path 20*a* is ON, and the second output-side clutch 2*e* of the second drive-transmission path 20*b* is OFF, the drive force is transmitted through the first drive-transmission path 20*a* to the second rotary shaft 5*b*, as indicated by arrow X1 in FIG. 12. In this case, the second rotary shaft 5*b* is driven to rotate in the opposite direction to the first rotary shaft 5*a*.

Figure 13:
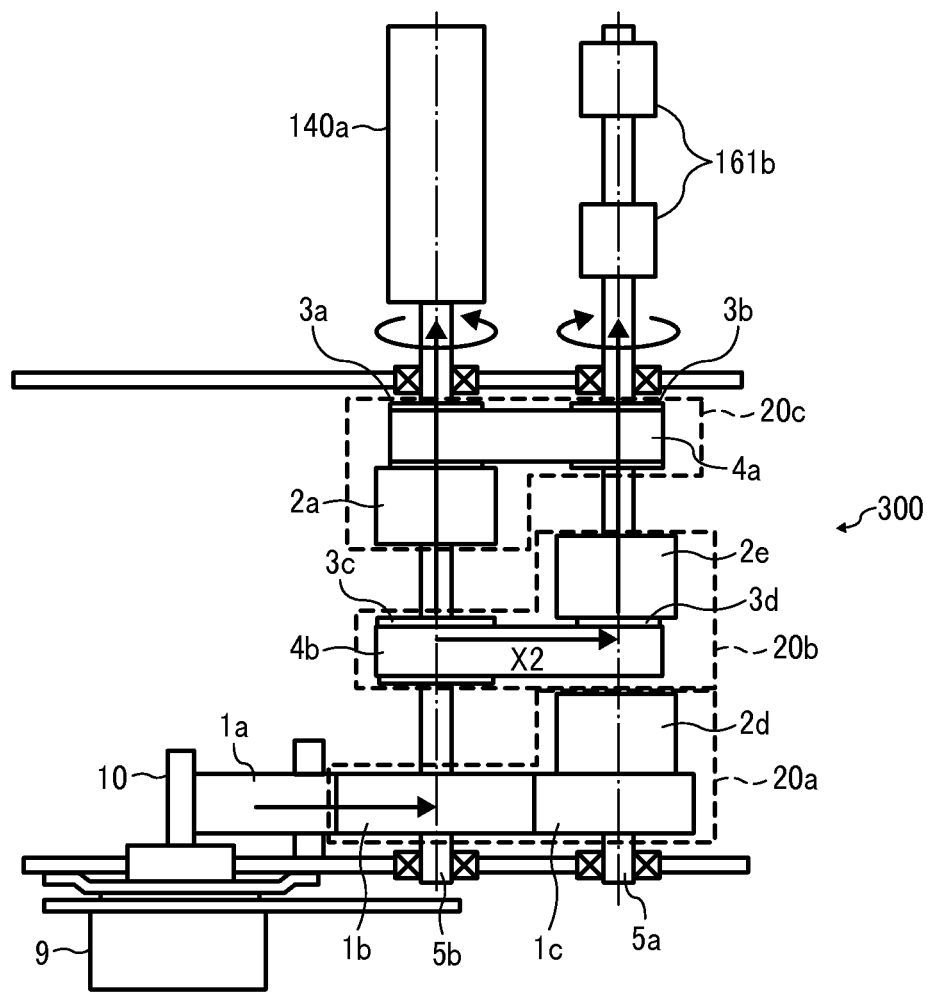
FIG. 13 is an illustration of drive transmission through the second drive-transmission path in the eighth variation of the driving device.

Next, referring to FIG. 13, when the input-side clutch 2*a* is OFF, the first output-side clutch 2*d* of the first drive-transmission path 20*a* is OFF, and the second output-side clutch 2*e* of the second drive-transmission path 20*b* is ON, the drive force is transmitted through the second drive-transmission path 20*b* to the second rotary shaft 5*b*, as indicated by arrow X2 in FIG. 13. In this case, the second rotary shaft 5*b* rotates in the same direction as the first rotary shaft 5*a* does. In FIGS. 12 and 13, the first output-side pulley 3*d* has a smaller diameter than the input-side pulley 3*c* does, in the second drive-transmission path 20*b*. With this configuration, the second rotary shaft 5*b* rotates at a faster speed than the first rotary shaft 5*a* does, by the drive force transmitted through the second drive-transmission path 20*b*.

Figure 14:
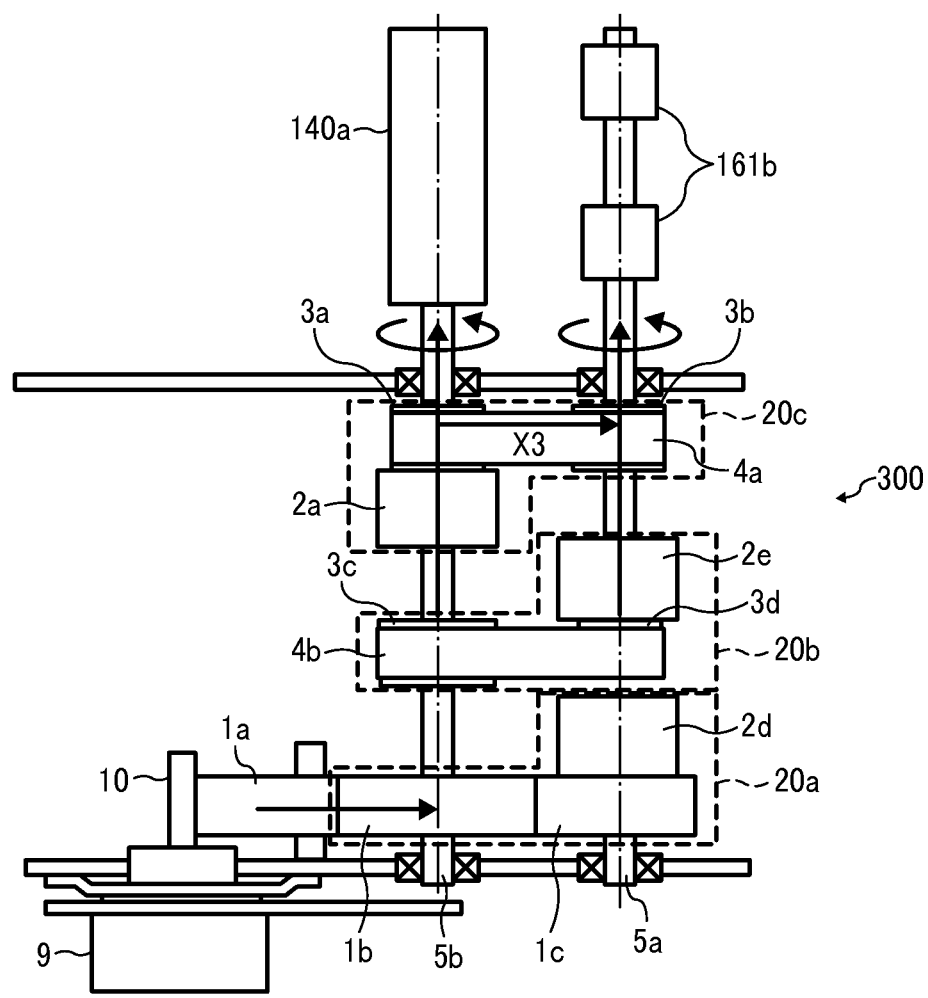
FIG. 14 is an illustration of drive transmission through a third drive-transmission path in the eighth variation of the driving device.

When the input-side clutch 2*a* is OFF, the first output-side clutch 2*d* of the first drive-transmission path 20*a* is ON, and the second output-side clutch 2*e* of the second drive-transmission path 20*b* is OFF, the drive force is transmitted through the first drive-transmission path 20*a* to the second rotary shaft 5*b*, as indicated by arrow X3 in FIG. 14. In this case, the second rotary shaft 5*b* rotates in the same direction as the first rotary shaft 5*a* does. In the third drive-transmission path 20*c*, the output-side pulley 3*b* has the same diameter as the input-side pulley 3*a*. With this configuration, the second rotary shaft 5*b* rotates at the same speed as the first rotary shaft 5*a* does, by the drive force transmitted through the third drive-transmission path 20*c*.

A description is provided of an example of drive control of the driving device 30H according to the eighth variation.

When starting an image forming operation, the input-side clutch 2*a* is set ON and the first and second output-side clutches 2*d* and 2*e* are set OFF to start driving the drive motor 9. At this time, a drive force is transmitted through the third drive-transmission path 20*c*, and the lower output roller 161*b* rotates at the same speed as the heat roller 140*a* does.

In the case of single-sided printing, when the output sensor 162 detects the front edge of the recording medium that is being fed forward, measuring time is started. Subsequently, when a predetermined time at which the rear edge of the recording medium, which is being fed forward, exits the fixing device comes, the input-side clutch 2*a* is set OFF before the second output-side clutch 2*e* is set ON. The predetermined time is determined beforehand based on the conveyance speed of the recording medium. Thereupon, the drive force is transmitted to the second rotary shaft 5*b* via the second drive-transmission path 20*b*, thereby rotating the lower output roller 161*b* at a faster speed than that of the heat roller 140*a*. With this configuration, speeding up the conveyance of the recording medium, the recording medium is output to the output tray 163 promptly, which increases productivity in the image forming apparatus of the present disclosure.

In the case of duplex printing, when the output sensor 162 detects a rear edge of the recording medium which is being fed forward, the input-side clutch 2*a* is switched from ON to OFF. Then, the first output-side clutch 2*d* is switched from OFF to ON. Accordingly, the drive-transmission path to the second rotary shaft 5*b* is switched from the third drive-transmission path 20*c* to the first drive-transmission path 20*a*, so that the lower output roller 161*b* rotates reversely. Subsequently, the recording medium is switched back and fed to the sheet re-feeder 170. When the output sensor 162 detects a rear edge of the recording medium which is being conveyed backward, the first output-side clutch 2*d* is switched from ON to OFF. Then, the input-side clutch 2*a* is switched from OFF to ON. Accordingly, the drive-transmission path to the second rotary shaft 5*b* is switched from the first drive-transmission path 20*a* to the third drive-transmission path 20*c*, so that the lower output roller 161*b* rotates in the same direction as the heat roller 140*a* again.

Subsequently, when the rear edge of the recording medium having both surfaces printed, which is being conveyed forward, exits the fixing device 140, the input-side clutch 2*a* is set OFF before the second output-side clutch 2*e* is set ON. Accordingly, speeding up the conveyance of the recording medium, the recording medium is output to the output tray 163.

In the eighth variation, the speed of rotation of the output rollers connected to the second rotary shaft 5*b* increases while the speed of the heat roller 140*a* connected to the first rotary shaft 5*a* is constant. In addition, the direction of rotation of the output rollers 161 varies while the direction of rotation of the heat roller 140*a* is unchanged. This configuration enables the switch back conveyance by the output rollers 161 and speeds up an output of the recording medium to the output tray 163, as described above.

In the present illustrative embodiment of the present disclosure, the output rollers 161 and the heat roller 140*a* are driven to rotate by the driving device. A first output target rotary body, which is driven to rotate by the first rotary shaft 5*a*, may be any suitable rollers that rotate at a constant speed. For example, examples of the first output target rotary body, which rotates by the first rotary shaft 5*a*, includes, but not limited to, a transfer roller, a conveyance roller, a photoconductor, and a developing roller. A second output target rotary body, which is caused to rotate by the second rotary shaft 5*b*, is also not limited to the output roller and may be any rollers which are caused to rotate forward and reverse, and to speed up and slow down the rotation.

Alternatively, the driving device described above may be employed in the automatic document feeder (ADF) 110 (refer to FIG. 1) to drive rollers for conveying a document. Alternatively, the driving device may be employed in the automatic document feeder (ADF) 110 (refer to FIG. 1) to drive a document output rollers 110a and a document delivery roller 110b. Specifically, any one of the driving devices according to the fifth variation through the seventh variation is used to rotate the document delivery roller 110b on the first rotary shaft 5a and the document output rollers 110a on the second rotary shaft 5b. In this case, one of the first drive-transmission path 20a and the second drive-transmission path 20b causes the document output roller 110a to rotate at the same speed as the document delivery roller 110b does, and the other to rotate the document output rollers 110a at a faster speed than the document delivery roller 110b.

Specifically, the document output rollers 110a, which have received the drive force transmitted through one drive-transmission path, continue to rotate at the same speed as the document delivery roller 110b does until the rear edge of the document passes through a scanning position Y in the direction as indicated by arrow. After the rear edge of the document passes through the scanning position Y, a clutch of the drive-transmission path employed is set OFF and another clutch of the other drive-transmission path employed is set ON. Accordingly, the speed of rotation of the document output roller 110a increases, thereby speeding up the delivery of the document interposed between the pair of the document output rollers 110a. This configuration allows the document, an image of which has been scanned, to be output to outside.

Alternatively, in some embodiments, a pick-up roller 110c is rotated by the first rotary shaft 5a and the document delivery roller 110b is rotated by the second rotary shaft 5b, for example. The pick-up roller 110c is capable of contacting and separating from a stack of documents placed on a document tray. In this case, when the pick-up roller 110c contacts and picks up a top sheet from the stack of documents to advance it forward, one drive-transmission path is employed to rotate the document delivery roller 110b at the same speed as the pick-up roller 110c does. When the front edge of the document advancing forward reaches the document delivery roller 110b to be delivered by the document delivery roller 110b, the pick-up roller 110c separates from the stack of the documents. After the pick-up roller 110c separates from the stack of the documents, the clutch of the drive-transmission path employed is set OFF and the clutch of the drive-transmission path is set ON. Accordingly, the speed of rotation of the document delivery roller 110b increases, thereby speeding up the delivery of the document. With this configuration, the document is conveyed to the scanning position promptly, thus increasing productivity in the image forming apparatus of the present disclosure.

Although numerous embodiments of the present disclosure are described above, the present disclosure is not limited to the foregoing embodiments and a variety of modifications can naturally be made within the scope of the present disclosure.

(Aspect 1)

A driving device such as the driving device 30 includes a first rotary shaft such as the first rotary shaft 5a, a second rotary shaft such as the second rotary shaft 5b, a plurality of drive-transmission paths, a drive-transmission device, and output target rotary bodies. The drive-transmission device selects any one of the drive-transmission paths and transmits drive force from the first rotary shaft to the second rotary shaft. The drive force is ultimately transmitted to both the first rotary shaft and the second rotary shaft to rotate the output target rotary bodies.

According to Aspect 1 as an example of the present disclosure, two output target rotary bodies are driven to rotate by a single driving device because each of the first rotary shaft and the second rotary shaft includes the output target rotary body. With this configuration, the number of the drive motors and drive-transmission members can be reduced as compared to the configuration in which a driving device is mounted for each output target rotary body. With this configuration, noise of the drive motors is suppressed, and noise of the image forming apparatus is thereby reduced. Furthermore, as the number of the drive motors and drive-transmission members is decreased, the number of components and the space for the apparatus can be reduced, achieving low cost.

(Aspect 2)

In Aspect 1, the drive-transmission device includes a forward drive-transmission path and a reverse drive-transmission path. The forward drive-transmission path rotates the second rotary shaft such as the second rotary shaft 5b in the same direction as the first rotary shaft such as the first rotary shaft 5a does. The reverse drive-transmission path rotates the second rotary shaft in the opposite direction to that of the first rotary shaft.

As described in the present illustrative embodiment, this drive-transmission device does not change the direction of rotation of the first output target rotary body such as the heat roller 140a driven by the first rotary shaft while changing the direction of rotation of the second output target rotary body such as the output roller 161 driven by the second rotary shaft.

(Aspect 3)

In Aspect 1 and Aspect 2, the drive-transmission device includes a plurality of drive-transmission paths to rotate the second rotary shaft such as the second rotary shaft 5b, which has received the drive force therethrough, in different speeds.

This drive-transmission device, as described in the fifth variation through the seventh variation, does not change the speed of rotation of the first output target rotary body such as the heat roller 140a driven by the first rotary shaft such as the first rotary shaft 5a while changing the speed of rotation of the second output target rotary body such as the output roller 161 driven by the second rotary shaft.

(Aspect 4)

In any one of Aspect 1 through Aspect 3, the drive-transmission device includes a plurality of forward drive-transmission paths that rotate the second rotary shaft such as the second rotary shaft 5b in the same direction as the first rotary shaft such as the first rotary shaft 5a. Further, the speed of rotation of the second rotary shaft varies with the forward drive-transmission paths through which the drive force is transmitted to the second rotary shaft.

This drive-transmission device, as described in the fifth variation through the seventh variation, changes the speed of the second output target rotary body such as the lower output roller 161b rotating in the same direction as the first output target rotary body such as the heat roller 140a driven to rotate by the first rotary shaft.

(Aspect 5)

In any one of Aspect 1 through Aspect 4, the drive-transmission device includes a plurality of reverse drive-transmission paths that rotate the second rotary shaft such as the second rotary shaft 5b in the opposite direction to the first rotary shaft such as the first rotary shaft 5a. Further, the speed of rotation of the second rotary shaft varies with the reverse drive-transmission paths through which the drive force is transmitted to the second rotary shaft.

This drive-transmission device, as described in the sixth variation, changes the speed of the second output target rotary body such as the output roller 161a rotating in the same direction as that of the first output target rotary body such as the heat roller 140a driven to rotate by the first rotary shaft.

(Aspect 6)

In any one of Aspect 1 through Aspect 5, each of the drive-transmission paths has a clutch.

As described in the present illustrative embodiments, any one of the plurality of the drive-transmission paths is selected by switching a clutch between ON and OFF to transmit the drive force to the second rotary shaft such as the second rotary shaft 5b.

(Aspect 7)

In any one of Aspect 1 through Aspect 6, a timing belt is employed in a drive-transmission path in which the most significant load fluctuation occurs when transmitting drive force.

With this configuration, as described in the present illustrative embodiment, the timing belt elastically deforms to absorb the load due to the load fluctuation generated during the transmission of the drive force. Accordingly, with the configuration including the timing belt, the drive-transmission members that constitute the drive-transmission path is prevented from being damaged due to the impact generated when setting the clutch ON.

(Aspect 8)

In any one of Aspect 1 through Aspect 7, a timing belt is employed in a drive-transmission path that rotates the second rotary shaft such as the second rotary shaft 5b at the fastest speed.

As described in the present illustrative embodiment, the configuration that utilizes the timing belt is advantageous from the viewpoint of quietness in a high-speed range as compared to the configuration with gears. With this configuration in which the timing belt is employed in the drive-transmission path that rotates the second rotary shaft at the fastest speed among the plurality of the drive-transmission paths, noise is reduced more than the configuration with the gears does.

(Aspect 9)

In any one of Aspect 1 through Aspect 8, at least one of the drive-transmission paths employs an internal gear to transmit the drive force therethrough.

As described in the present illustrative embodiment, employing the internal gears increases the meshing ratio of gears, thereby suppressing rotational unevenness, noise, and vibration due to meshing failure of the gears as compared to the configuration that utilizes external gears.

(Aspect 10)

In Aspect 9, the drive-transmission path that employs the internal gears is used for the longest period of time or used most frequently among the plurality of drive-transmission paths.

As described in the present illustrative embodiment, this configuration makes effective use of the advantageous effects of the internal gears, thus suppressing rotational unevenness, noise, and vibration due to meshing failure of the gears.

(Aspect 11)

In any one of Aspect 1 through Aspect 10, at least one of the drive-transmission paths includes the external gears only.

As described in the present illustrative embodiment, this configuration is more durable than those with the internal gears or the timing belt. Therefore, as at least one of the drive-transmission paths includes the external gears only, the durability thereof is increased.

(Aspect 12)

In any one of Aspect 1 through Aspect 11, each of the drive-transmission paths includes the gears alone. Among the drive-transmission paths, the drive-transmission path, which is used most frequently or used for the longest period of time, includes the most-reduced number of teeth.

As described in the fourth variation, having fewer gears (portions where teeth mesh with each other) produces less noise and is more durable. Therefore, minimizing the number of teeth in the drive-transmission paths that is used for the longest period of time and used most frequently increases the quietness and durability.

(Aspect 13)

An image forming apparatus such as the image forming apparatus 100 includes any one of the driving devices according to Aspect 1 through Aspect 12.

With this configuration, the number of the driving devices is reduced in the image forming apparatus and the quietness of the apparatus is increased. In addition, the number of components and the size of the apparatus is reduced, achieving low cost.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A driving device comprising:
    a first rotary shaft;
    a second rotary shaft;
    a drive-transmission device including a plurality of drive-transmission paths to selectively transmit a drive force from the first rotary shaft to the second rotary shaft via any one of the plurality of drive-transmission paths;
    a first output target rotary body mounted on the first rotary shaft; and
    a second output target rotary body mounted on the second rotary shaft,
    wherein the plurality of drive-transmission paths includes a forward drive-transmission path and a reverse drive-transmission path,
    the forward drive-transmission path rotates the second rotary shaft in the same direction as a direction in which the first rotary shaft rotates, and
    the reverse drive-transmission path rotates the second rotary shaft in a direction opposite to the direction in which the first rotary shaft rotates.

2. The driving device of claim 1, wherein the plurality of drive-transmission paths includes a plurality of reverse drive-transmission paths to transmit the drive force to the second rotary shaft to rotate the second rotary shaft in a direction opposite to a direction in which the first rotary shaft rotates and at different speeds between the plurality of reverse drive-transmission paths.

3. The driving device of claim 1, wherein each of the plurality of drive-transmission paths includes a clutch.

4. The driving device of claim 1, wherein at least one drive-transmission path of the plurality of drive-transmission paths includes an internal gear to transmit the drive force.

5. The driving device of claim 4, wherein the at least one drive-transmission path including the internal gear is a drive-transmission path to be used most frequently or for a longest period of time among the plurality of drive-transmission paths.

6. The driving device of claim 1, wherein at least one drive-transmission path of the plurality of drive-transmission paths includes at least one external gear only.

7. An image forming apparatus comprising the driving device of claim 1.

8. A driving device comprising:
a first rotary shaft;
a second rotary shaft;
a drive-transmission device including a plurality of drive-transmission paths to selectively transmit a drive force from the first rotary shaft to the second rotary shaft via any one of the plurality of drive-transmission paths;
a first output target rotary body mounted on the first rotary shaft; and
a second output target rotary body mounted on the second rotary shaft,
wherein the plurality of drive-transmission paths transmits the drive force to the second rotary shaft to rotate the second rotary shaft at different speeds between the plurality of drive-transmission paths.

9. A driving device comprising:
a first rotary shaft;
a second rotary shaft;
a drive-transmission device including a plurality of drive-transmission paths to selectively transmit a drive force from the first rotary shaft to the second rotary shaft via any one of the plurality of drive-transmission paths;
a first output target rotary body mounted on the first rotary shaft; and
a second output target rotary body mounted on the second rotary shaft,
wherein the plurality of drive-transmission paths includes a plurality of forward drive-transmission paths to transmit the drive force to the second rotary shaft to rotate the second rotary shaft in the same direction as a direction in which the first rotary shaft rotates and at different speeds between the plurality of forward drive-transmission paths.

10. A driving device comprising:
a first rotary shaft;
a second rotary shaft;
a drive-transmission device including a plurality of drive-transmission paths to selectively transmit a drive force from the first rotary shaft to the second rotary shaft via any one of the plurality of drive-transmission paths;
a first output target rotary body mounted on the first rotary shaft; and
a second output target rotary body mounted on the second rotary shaft,
wherein at least one of the plurality of drive-transmission paths includes a timing belt to transmit the drive force.

11. A driving device comprising:
a first rotary shaft;
a second rotary shaft;
a drive-transmission device including a plurality of drive-transmission paths to selectively transmit a drive force from the first rotary shaft to the second rotary shaft via any one of the plurality of drive-transmission paths;
a first output target rotary body mounted on the first rotary shaft; and
a second output target rotary body mounted on the second rotary shaft,
wherein one drive-transmission path to rotate the second rotary shaft at a fastest speed among the plurality of drive-transmission paths includes a timing belt to transmit the drive force.

12. A driving device comprising:
a first rotary shaft;
a second rotary shaft;
a drive-transmission device including a plurality of drive-transmission paths to selectively transmit a drive force from the first rotary shaft to the second rotary shaft via any one of the plurality of drive-transmission paths;
a first output target rotary body mounted on the first rotary shaft; and
a second output target rotary body mounted on the second rotary shaft,
wherein each of the plurality of drive-transmission paths includes at least one gear only, and
one drive-transmission path to be used most frequently or for a longest period of time has a smallest number of teeth among the plurality of drive-transmission paths.

\* \* \* \* \*